United States Patent
Sato et al.

(10) Patent No.: US 8,908,066 B2
(45) Date of Patent: Dec. 9, 2014

(54) SOLID STATE IMAGING DEVICE

(75) Inventors: Maki Sato, Kanagawa (JP); Kazuki Hizu, Kanagawa (JP); Tetsuya Amano, Chiba (JP); Katsuya Kudo, Kanagawa (JP); Toyoharu Igarashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 413 days.

(21) Appl. No.: 13/279,794

(22) Filed: Oct. 24, 2011

(65) Prior Publication Data
US 2012/0194718 A1 Aug. 2, 2012

(30) Foreign Application Priority Data
Feb. 1, 2011 (JP) ................................. 2011-019865

(51) Int. Cl.
*H04N 5/217* (2011.01)
*H04N 5/361* (2011.01)
*H04N 5/378* (2011.01)
*H04N 5/357* (2011.01)

(52) U.S. Cl.
CPC ............... *H04N 5/357* (2013.01); *H04N 5/361* (2013.01); *H04N 5/378* (2013.01); *H04N 5/3572* (2013.01)
USPC .......................................... 348/241; 348/308

(58) Field of Classification Search
USPC .......... 348/241, 243, 251, 294, 300, 301, 302
See application file for complete search history.

(56) References Cited

U.S. PATENT DOCUMENTS

| 7,015,844 B1* | 3/2006 | Boemler ........................ 341/143 |
| 7,952,621 B2* | 5/2011 | Yamauchi ..................... 348/243 |
| 2006/0001564 A1* | 1/2006 | Yamagata et al. ............. 341/169 |
| 2008/0158378 A1* | 7/2008 | Lee ............................ 348/222.1 |

FOREIGN PATENT DOCUMENTS

| JP | 2002-118791 A | 4/2002 |
| JP | 2007-329655 | 12/2007 |
| JP | 2008-141595 | 6/2008 |
| JP | 2008-236158 | 10/2008 |
| WO | WO 02/45414 A1 | 6/2002 |

OTHER PUBLICATIONS

Office Action issued Sep. 10, 2013, in Japanese Patent Application No. 2011-019865 (with English-language translation).

* cited by examiner

*Primary Examiner* — Paul Berardesca
(74) *Attorney, Agent, or Firm* — Oblon, Spivak, McClelland, Maier & Neustadt, L.L.P.

(57) ABSTRACT

According to one embodiment, a solid state imaging device includes an imaging unit that outputs imaging data by performing an imaging operation, a temperature sensor that outputs a diode voltage according to a diode current, and an output circuit that shares a part of a circuit with the imaging unit and outputs temperature data based on the diode voltage outputted from the temperature sensor in the same semiconductor chip.

19 Claims, 23 Drawing Sheets

US 8,908,066 B2

SOLID STATE IMAGING DEVICE

CROSS-REFERENCE TO RELATED APPLICATIONS

This application is based upon and claims the benefit of priority from Japanese Patent Application No. 2011-19865, filed on Feb. 1, 2011; the entire contents of which are incorporated herein by reference.

FIELD

Embodiments described herein relate generally to a solid state imaging device.

BACKGROUND

In a solid state imaging device, noise and defects in a captured image may become obvious as temperature increases, or distortion may occur in a captured image due to variation of temperature. Therefore, a temperature sensor is mounted in a solid state imaging device and an image signal is corrected based on the temperature of the solid state imaging device.

Here, when a temperature sensor is mounted in a solid state imaging device, it is preferred to reduce a circuit scale of an output circuit of the temperature sensor in order to suppress increase in a circuit scale of the solid state imaging device.

Conventionally, an imaging chip and a temperature measurement semiconductor chip are separated from each other or a circuit block related to temperature measurement is present independently from a signal processing circuit block for the imaging element, and correction is performed in a temperature correction circuit in a later stage by using stored temperature measurement data.

DETAILED DESCRIPTION

In general, according to one embodiment, a solid state imaging device includes an imaging unit, a temperature sensor, and an output circuit. The imaging unit outputs captured image data by performing an imaging operation. The temperature sensor outputs a diode voltage according to a diode current. The output circuit shares a part of a circuit with the imaging unit and outputs temperature data based on the diode voltage outputted from the temperature sensor.

Exemplary embodiments of solid state imaging devices will be explained below in detail with reference to the accompanying drawings. The present invention is not limited to the following embodiments.

(First Embodiment)

Figure 1:
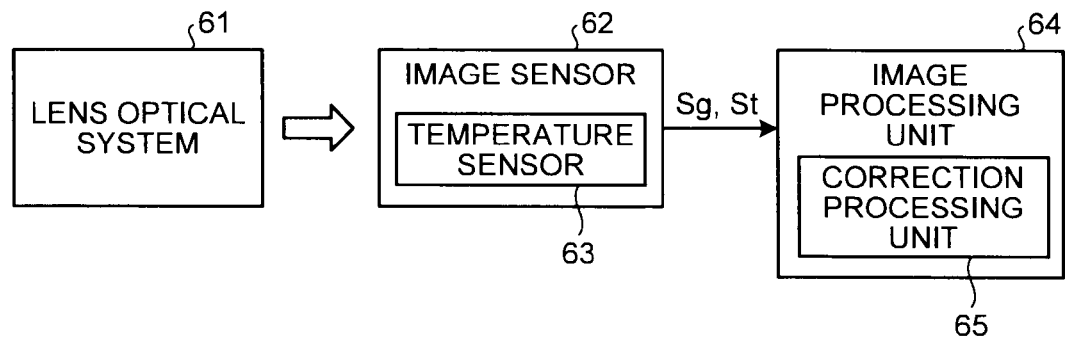
FIG. 1 is a block diagram illustrating a schematic configuration of an image processing unit to which a solid state imaging device according to a first embodiment is applied.

FIG. 1 is a block diagram illustrating a schematic configuration of an image processing unit to which a solid state imaging device according to a first embodiment is applied.

In FIG. 1, a lens optical system 61 is provided in the previous stage of an image sensor 62, and an image processing unit 64 is provided in the next stage of the image sensor 62. A temperature sensor 63, which outputs a diode voltage according to a diode current, is mounted in the image sensor 62. The image processing unit 64 is provided with a correction processing unit 65 which performs correction processing of pixel data Sg on the basis of temperature data St. A solid state imaging device as illustrated in FIG. 2, 13, 15, or 20 can be used as the image sensor 62.

Here, there may be a case in which all circuits of the lens optical system 61, the image sensor 62, and the correction processing unit 65 may be in the same chip, or may be a case in which the lens optical system 61 and the image sensor 62 form the imaging chip and the correction processing unit 65 forms another semiconductor chip. The present embodiment is characterized in that a temperature measurement function is mounted in the imaging chip.

When light enters the image sensor 62 through the lens optical system 61, the pixel data Sg according to an amount of the light is generated. At the same time, the temperature data St is calculated on the basis of the diode voltage outputted from the temperature sensor 63 and transmitted to the image processing unit 64. In the correction processing unit 65, correction processing of the pixel data Sg is performed on the basis of the temperature data St, and image processing of the pixel data Sg, on which the correction processing is performed, is performed.

In the correction processing of the pixel data Sg, it is possible to eliminate distortion of the pixel data Sg due to variation of the refractive index and the size of the lens optical system 51 caused by variation of temperature, as well as to eliminate fixed pattern noise and white spots due to dark current of a photodiode PD.

Examples of the image processing of the pixel data Sg include shading compensation, color separation interpolation processing, masking processing, γ correction processing, color space conversion processing, brightness adjustment, contrast adjustment, color adjustment, and intensity adjustment.

Figure 2:
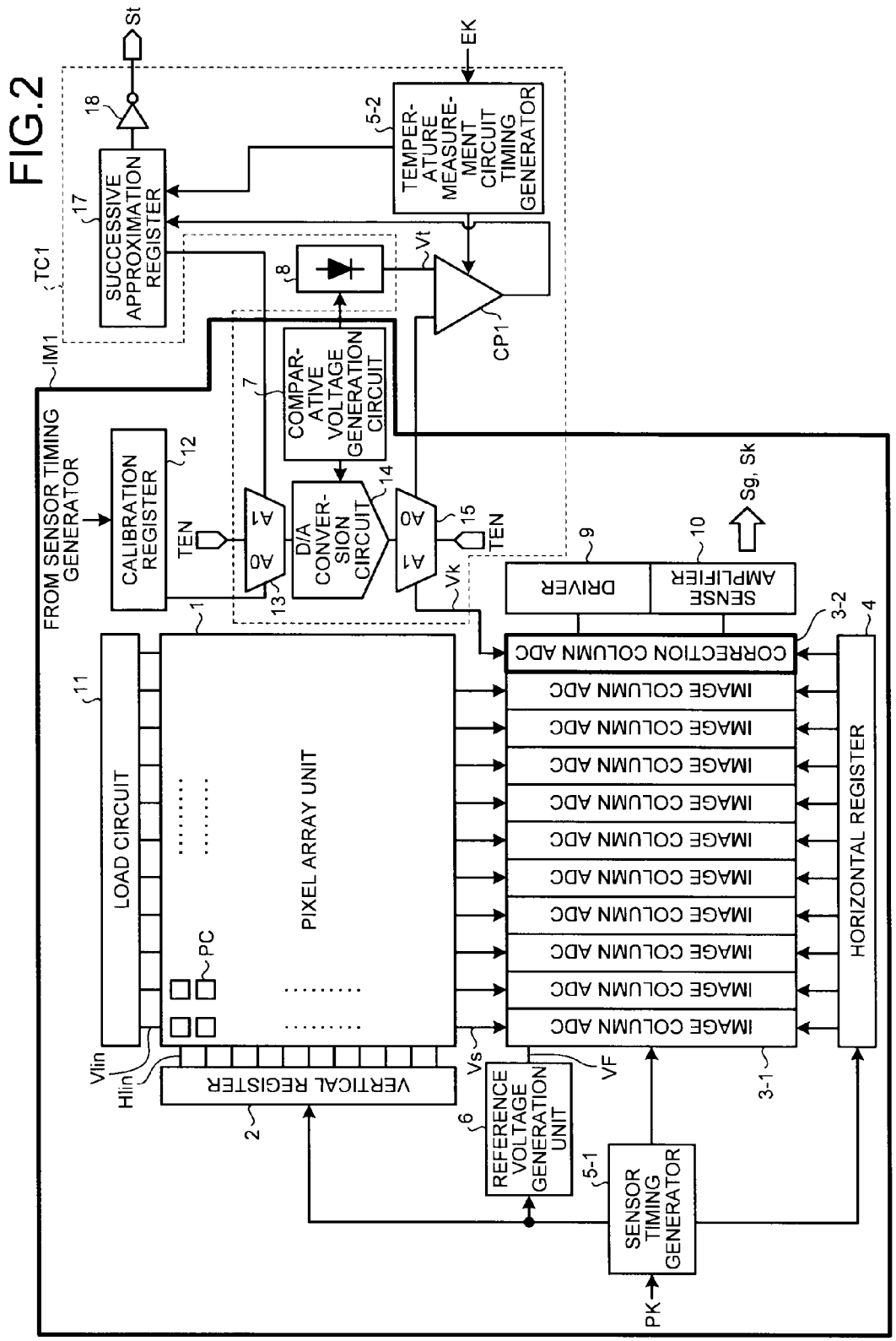
FIG. 2 is a block diagram illustrating a schematic configuration of the solid state imaging device according to the first embodiment.

FIG. 2 is a block diagram illustrating a schematic configuration of the solid state imaging device according to the first embodiment.

In FIG. 2, the solid state imaging device is provided with an imaging unit IM1 which performs an imaging operation and outputs captured image data Sg, a temperature sensor 8 which outputs a diode voltage Vt according to a diode current, and an output circuit TC1 which outputs the temperature data St based on the diode voltage Vt. Here, the output circuit TC1 shares a part of a circuit with the imaging unit IM1.

Specifically, the imaging unit IM1 is provided with a pixel array unit 1 in which pixels PC that accumulate photoelectrically-converted charge are arranged in a matrix form in a row direction and a column direction, a vertical register 2 which scans the pixels PC to be read in a vertical direction, a temperature sensor 8 which outputs the diode voltage Vt according to the diode current, a comparative voltage generation unit 7 which generates a comparative voltage to be a base of the temperature sensor 8 and a D/A conversion circuit 14, image column ADCs 3-1 which output pixel data Sg digitalized based on a difference between a pixel voltage Vs read from a pixel PC during a reset period and a pixel voltage Vs read from the pixel PC during a signal read period, a correction column ADC 3-2 which outputs calibration data Sk digitalized based on a calibration voltage Vk, a horizontal register 4 which scans the pixels PC to be read in a horizontal direction, a sensor timing generator 5-1 which controls output timing of the pixel data Sg and the calibration data Sk on the basis of a sensor clock PK, a reference voltage generation unit 6 which outputs a reference voltage VF to the image column ADCs 3-1 and the correction column ADC 3-2, a driver 9 which drives the image column ADCs 3-1 and the correction column ADC 3-2, a sense amplifier 10 which detects signals outputted from the image column ADCs 3-1 and the correction column ADC 3-2, a load circuit 11 which causes potentials of vertical signal lines Vlin to follow the signals read from the pixels PC, a calibration register 12 which holds a calibration code, and the D/A conversion circuit 14 which converts the calibration code into analog.

Here, in the pixel array unit 1, horizontal control lines Hlin that control reading of the pixels PC are provided in the row direction and vertical signal lines Vlin that transfer signals read from the pixels PC are provided in the column direction. A ramp wave can be used as the reference voltage VF outputted from the reference voltage generation unit 6. A band-gap reference circuit can be used as the comparative voltage generation unit 7.

The output circuit TC1 is provided with a comparator CP1 which compares the diode voltage Vt outputted from the temperature sensor 8 with an output from the D/A conversion circuit 14, a successive approximation register 17 which holds an output from the comparator CP1, an inverter 18 which inverts an output of the successive approximation register 17 and outputs it as the temperature data St, a temperature measurement circuit timing generator 5-2 which controls output timing of the temperature data St on the basis of a system clock EK, a selector 13 which switches the calibration code and a value held by the successive approximation register 17 and outputs one of them to the D/A conversion circuit 14, and a selector 15 which outputs the output from the D/A conversion circuit 14 to the comparator CP1 or the correction column ADC 3-2 by switching.

A switching signal TEN is inputted into the selectors 13 and 15. When the calibration code is selected by the selector 13, the correction column ADC 3-2 is selected by the selector 15. On the other hand, when the value held by the successive approximation register 17 is selected by the selector 13, the comparator CP1 is selected by the selector 15.

Here, the comparative voltage generation unit 7, the D/A conversion circuit 14, and the selectors 13 and 15 are shared between the imaging unit IM1 and the output circuit TC1. The imaging unit IM1, the temperature sensor 8, and the output circuit TC1 can be mounted on the same semiconductor chip. When the power of the imaging unit IM1 is turned off, the sensor clock PK stops and the system clock EK runs.

The pixels PC are scanned in the vertical direction by the vertical register 2, so that the pixels PC in the row direction are selected and the pixel voltages Vs read from the pixels PC are transmitted to the image column ADCs 3-1 via the vertical signal lines Vlin. Here, in the load circuit 11, a source follower is formed between the load circuit 11 and the pixels PC when the signals are read from the pixels PC, so that the potentials of the vertical signal lines Vlin follow the pixel voltages Vs read from the pixels PC.

In each image column ADC 3-1, the pixel voltage Vs read from a pixel PC during the reset period and the pixel voltage Vs read from the pixel PC during the signal read period are sampled and a difference between them is calculated, so that a signal component of each pixel PC is digitalized by CDS and outputted as the pixel data Sg through the sense amplifier 10.

The calibration code is stored in the calibration register 12 via the sensor timing generator 5-1. When the calibration code is selected by the selector 13 and the correction column ADC 3-2 is selected by the selector 15, the calibration code is converted into analog by the D/A conversion circuit 14, so that the calibration code is converted into a calibration voltage Vk and outputted to the correction column ADC 3-2. Then, in the correction column ADC 3-2, the calibration voltage Vk is digitalized on the basis of a comparison result between the calibration voltage Vk and the reference voltage VF, and outputted as the calibration data Sk via the sense amplifier 10.

When the value held by the successive approximation register 17 is selected by the selector 13 and the comparator CP1 is selected by the selector 15, the value held by the successive approximation register 17 is converted into analog by the D/A conversion circuit 14 and inputted into the comparator CP1. Then, in the comparator CP1, outputs of the D/A conversion circuit 14 are sequentially compared with the diode voltage Vt according to the system clock EK and the comparison results are sequentially stored in the successive approximation register 17, so that the diode voltage Vt is digitalized and outputted as the temperature data St via the inverter 18. The temperature data St can be outputted at least once in one frame period. An output terminal of the temperature data St can be provided separately from output terminals of the calibration data Sk and the pixel data Sg.

Here, the comparative voltage generation unit 7, the D/A conversion circuit 14, and the selectors 13 and 15 are shared between the imaging unit IM1 and the output circuit TC1, so that it is possible to mount the temperature sensor 8 in the solid state imaging device while reducing a circuit scale of the output circuit TC1.

Further, by operating the output circuit TC1 according to the system clock EK, it is possible to output the temperature data St even if the sensor clock PK stops when the power of the imaging unit IM1 is turned off.

Figure 3:
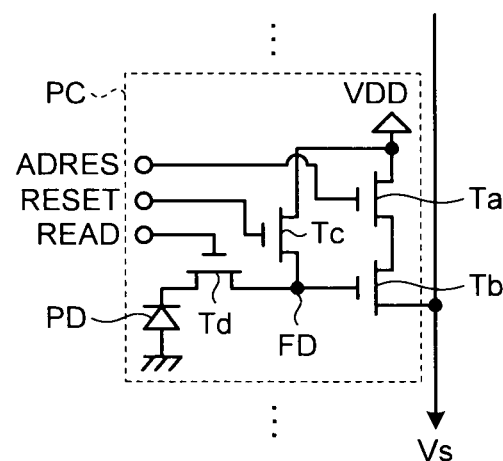
FIG. 3 is a circuit diagram illustrating a configuration example of a pixel PC in FIG. 2.

FIG. 3 is a circuit diagram illustrating a configuration example of the pixel PC in FIG. 2.

In FIG. 3, the pixel PC is provided with a photodiode PD, a row selection transistor Ta, an amplifier transistor Tb, a reset transistor Tc, and a read transistor Td. A floating diffusion FD is formed at a connection point among the amplifier transistor Tb, the reset transistor Tc, and the read transistor Td as a detection node.

In the pixel PC, the source of the read transistor Td is connected to the photodiode PD and a read signal READ is inputted into the gate of the read transistor Td. The source of the reset transistor Tc is connected to the drain of the read transistor Td, a reset signal RESET is inputted into the gate of the reset transistor Tc, and the drain of the reset transistor Tc is connected to a power supply potential VDD. A row selection signal ADRES is inputted into the gate of the row selection transistor Ta and the drain of the row selection transistor Ta is connected to the power supply potential VDD. The source of the amplifier transistor Tb is connected to the vertical signal line Vlin, the gate of the amplifier transistor Tb is connected to the drain of the read transistor Td, and the drain of the amplifier transistor Tb is connected to the source of the row selection transistor Ta. The horizontal control lines Hlin in FIG. 2 can transmit the read signal READ, the reset signal RESET, and the row selection signal ADRES to the pixels PC for each row.

Figure 4:
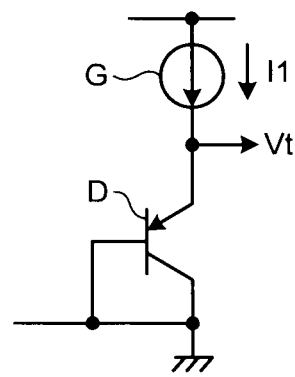
FIG. 4 is a circuit diagram illustrating a configuration example of a temperature sensor 8 in FIG. 2.

FIG. 4 is a circuit diagram illustrating a configuration example of the temperature sensor 8 in FIG. 2.

In FIG. 4, the temperature sensor 8 is provided with a diode D and a current source G, and the current source G is connected to the diode D in series. As the diode D, for example, a bipolar transistor whose collector and base are connected to each other can be used. The current source G outputs a diode current I to the diode D and the diode D can output the diode voltage Vt according to the diode current I.

Here, when the diode D is used as the temperature sensor 8, the diode voltage Vt with respect to a diode current I1 is measured from the current-voltage characteristics of the diode D. Temperature can be read from the diode voltage Vt by assuming that the diode voltage Vt is proportional to temperature.

At this time, the diode current I1 can be given by the formula (1) described below.

$$I1 = Is * \exp(qVt/kBT) \qquad (1)$$

Here, Is is reverse current, T is temperature (temperature unit is Kelvin), kB is a Boltzmann constant ($=8.62 *10^{-5}$ eV/K), and q is an amount of charge ($=1.602*10^{-19}$) Coulomb.

When the formula (1) is expanded, the formula (2) described below can be obtained.

$$Vt = kBT/q \cdot \ln(I1/Is) \qquad (2)$$

If T is 300 K (27° C.), kBT/q is a constant of 0.0259 (V). In other words, if kB, q, and Is are constants, the temperature T can be obtained from the current-voltage characteristics, which are a relationship between Vt and I1 of the formula (2).

Figure 5:
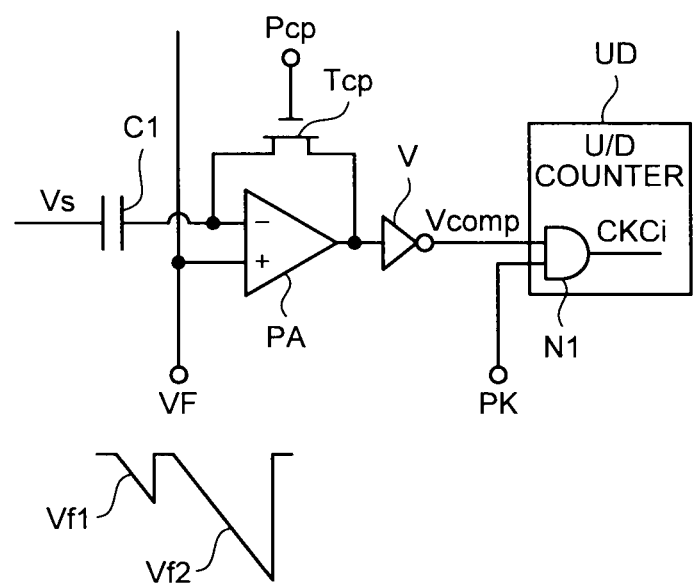
FIG. 5 is a circuit diagram illustrating a configuration example of an image column ADC 3-1 in FIG. 2.

FIG. 5 is a circuit diagram illustrating a configuration example of the image column ADC 3-1 in FIG. 2.

In FIG. 5, an image column ADC 3-1 is provided with a capacitor C1, a comparator PA, a switch transistor Tcp, an inverter V, and an up/down counter UD for each column. The up/down counter UD is provided with a logical AND circuit N1.

The vertical signal line Vlin is connected to the inverting input terminal of the comparator PA via the capacitor C1, and the reference voltage VF is inputted into the noninverting input terminal of the comparator PA. The switch transistor Tcp is connected between the inverting input terminal and the output terminal of the comparator PA. The output terminal of the comparator PA is connected to one input terminal of the logical AND circuit N1 via the inverter V, and a sensor clock PK is inputted into the other input terminal of the logical AND circuit N1.

When the row selection signal ADRES is low level, the row selection transistor Ta is in an off state and does not perform a source follower operation, so that no signal is outputted to the vertical signal line Vlin. At this time, if the read signal READ and the reset signal RESET become high level, the read transistor Td turns on, and charge accumulated in the photodiode PD is discharged to the floating diffusion FD. Then, the charge is discharged to the power supply VDD through the reset transistor Tc.

After the charge accumulated in the photodiode PD is discharged to the power supply VDD, when the read signal READ becomes low level, accumulation of effective signal charge is started in the photodiode PD.

Next, when the row selection signal ADRES becomes high level, the row selection transistor Ta of the pixel PC turns on and the power supply potential VDD is applied to the drain of the amplifier transistor Tb, so that a source follower is formed by the amplifier transistor Tb and a load transistor TL.

Next, when the reset signal RESET rises, the reset transistor Tc turns on, and excess charge generated in the floating diffusion FD by leakage current or the like is reset. A voltage according to a reset level of the floating diffusion FD is applied to the gate of the amplifier transistor Tb.

If a reset pulse Pcp is applied to the gate of the switch transistor Tcp while the pixel voltage Vs according to the reset level is outputted to the vertical signal line Vlin, an input voltage of the inverting input terminal of the comparator PA is clamped by the output voltage and an operating point is set. At this time, a difference from the pixel voltage Vs of the vertical signal line Vlin is held by the capacitor C1 and the input voltage of the comparator PA is set to zero.

After the switch transistor Tcp turns off, while the pixel voltage Vs at the reset level is inputted into the comparator PA via the capacitor C1, a ramp wave Vf1 is provided as the reference voltage VF, and the pixel voltage Vs at the reset level and the ramp wave Vf1 are compared. The output voltage of the comparator PA is inverted by the inverter V, and then inputted into one input terminal of the logical AND circuit N1 as the output voltage Vcomp.

The sensor clock PK is inputted into the other input terminal of the logical AND circuit Nl1. When the pixel voltage Vs at the reset level is smaller than a level of the ramp wave Vf1, the output voltage Vcomp becomes high level. Therefore, the sensor clock PK passes through the logical AND circuit N1, and the sensor clock PKi which passed through the logical AND circuit N1 is down-counted by the up/down counter UD.

When the pixel voltage Vs at the reset level corresponds to the level of the ramp wave Vf1, the output voltage of the comparator PA falls and the output voltage Vcomp becomes low level. Therefore, the sensor clock PK is cut off by the logical AND circuit N1, and down-counting is stopped in the up/down counter UD1, so that the pixel voltage Vs at the reset level is digitalized.

Next, when the read signal READ rises, the read transistor Td turns on, the charge accumulated in the photodiode PD is transferred to the floating diffusion FD, and a voltage according to a signal level of the floating diffusion FD is applied to the gate of the amplifier transistor Tb.

While the pixel voltage Vs at the signal level is inputted into the comparator PA via the capacitor C1, a ramp wave Vf2 is provided as the reference voltage VF, and the pixel voltage Vs at the signal level and the ramp wave Vf2 are compared. The output voltage of the comparator PA is inverted by the inverter V, and then inputted into one input terminal of the logical AND circuit N1 as the output voltage Vcomp.

When the pixel voltage Vs at the signal level is smaller than a level of the ramp wave Vf2, the output voltage Vcomp becomes high level. Therefore, the sensor clock PK passes through the logical AND circuit N1, and the sensor clock PKi which passed through the logical AND circuit N1 is up-counted by the up/down counter UD. When the pixel voltage Vs at the signal level corresponds to the level of the ramp wave Vf2, the output voltage of the comparator PA falls and the output voltage Vcomp becomes low level. Therefore, the sensor clock PK is cut off by the logical AND circuit N1, and up-counting is stopped in the up/down counter UD, so that a difference between the pixel voltage Vs at the signal level and the pixel voltage Vs at the reset level is digitalized.

The correction column ADC 3-2 can be formed in the same manner as the image column ADC 3-1 in FIG. 4.

Figure 6:
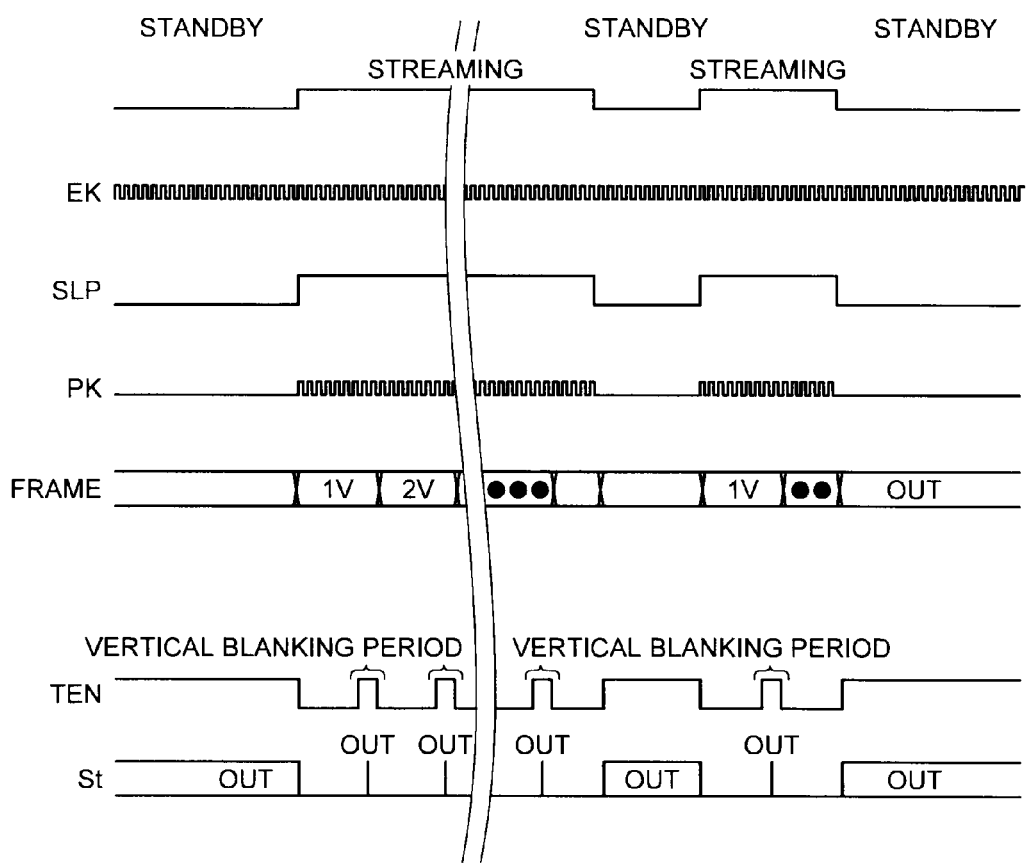
FIG. 6 is a timing chart illustrating a temperature measurement operation of the solid state imaging device in FIG. 2.

FIG. 6 is a timing chart illustrating a temperature measurement operation of the solid state imaging device in FIG. 2.

In FIG. 6, when a power-down signal SLP is high level, a streaming state is established, the sensor clock PK is activated, and the imaging operation is performed. In this case, the switching signal TEN becomes high level during a vertical blanking period, the value held by the successive approximation register 17 is selected by the selector 13, the comparator CP1 is selected by the selector 15, and the temperature data St is outputted for each minimum conversion clock cycle.

On the other hand, when the power-down signal SLP is high level, during a period other than the vertical blanking period BH, the switching signal TEN becomes low level, the calibration code is selected by the selector 13, the correction column ADC 3-2 is selected by the selector 15, the calibration data Sk is outputted, and the pixel data Sg is outputted for each frame via the image column ADC 3-1.

On the other hand, when the power-down signal SLP is low level, a standby state is established, the sensor clock PK is stopped, and the imaging operation is stopped. In this case, the switching signal TEN becomes high level, the value held by the successive approximation register 17 is selected by the selector 13, the comparator CP1 is selected by the selector 15, and the output circuit TC1 is activated according to the system clock EK, so that the temperature data St is outputted.

Figure 7:
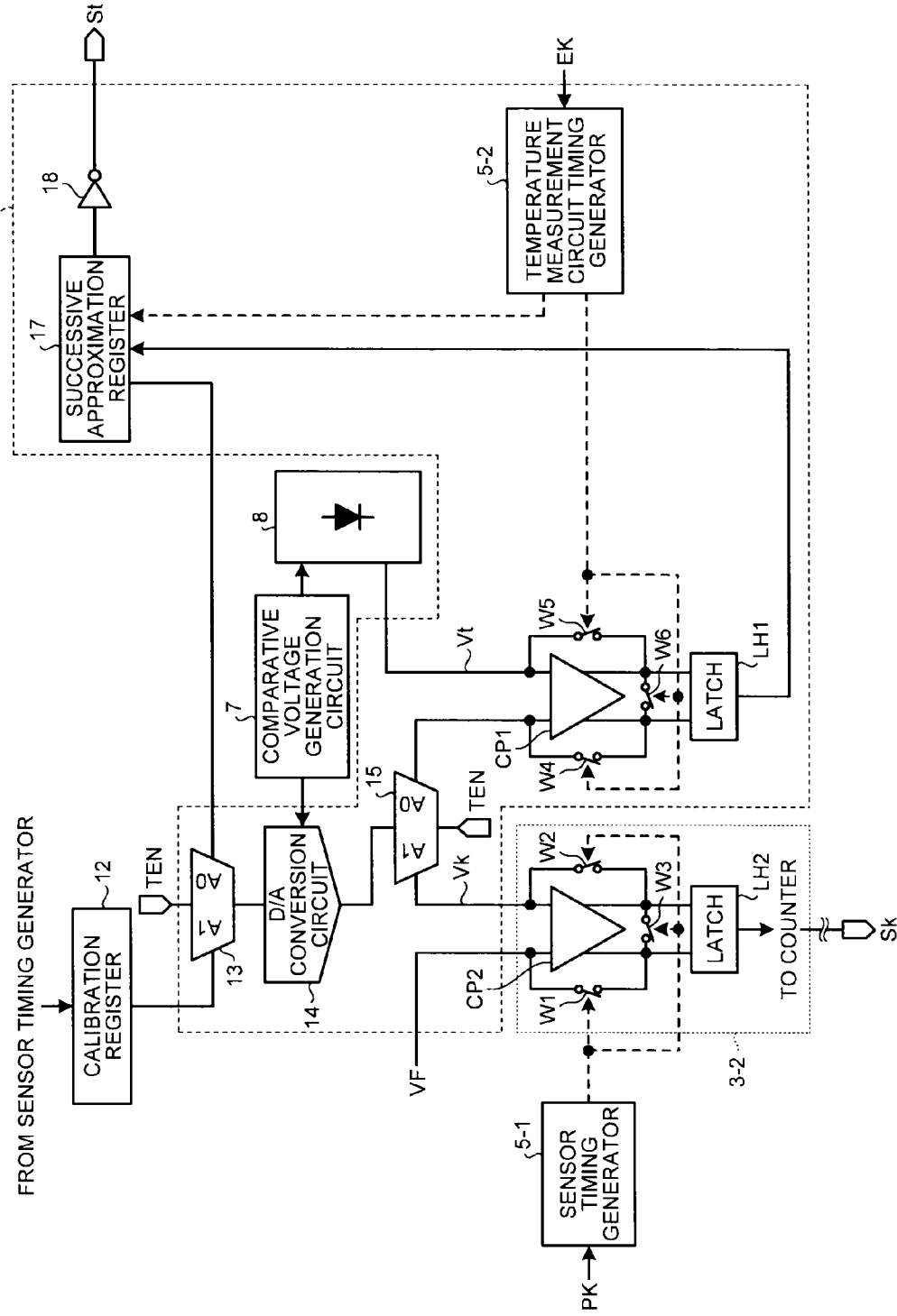
FIG. 7 is a block diagram illustrating a detailed configuration example of an output circuit TC1 in FIG. 2.

FIG. 7 is a block diagram illustrating a detailed configuration example of the output circuit TC1 in FIG. 2.

In FIG. 7, switches W4 to W6 are inserted between the inputs and the outputs of the comparator CP1, and a latch circuit LH1 is connected to the next stage of the comparator CP1.

The correction column ADC 3-2 is provided with a comparator CP2 and a latch circuit LH2. Switches W1 to W3 are inserted between the inputs and the outputs of the comparator CP2, and a latch circuit LH2 is connected to the next stage of the comparator CP2.

The switches W1 to W3 are turned on for each horizontal period, so that an operating point of the comparator CP2 is set. When the switches W1 to W3 are turned off, the calibration voltage Vk and the reference voltage VF are compared by the comparator CP2 and a comparison result thereof is latched by the latch circuit LH2.

The switches W4 to W6 are turned on for each temperature measurement, so that an operating point of the comparator CP1 is set. When the switches W4 to W6 are turned off, the output of the D/A conversion circuit 14 and the diode voltage Vt are compared by the comparator CP1 and a comparison result thereof is latched by the latch circuit LH1.

Figure 8:
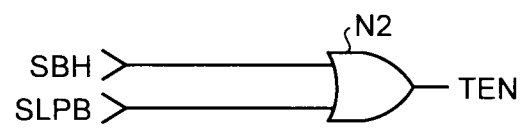
FIG. 8 is a diagram illustrating a circuit for generating a temperature enable signal TEN of the solid state imaging device in FIG. 2.

FIG. 8 is a diagram illustrating a circuit for generating a temperature enable signal TEN of the solid state imaging device in FIG. 2.

In FIG. 8, a signal SBH which specifies one horizontal period during a vertical blank period and an inversion signal SLPB of the power-down signal SLP are inputted into a logical OR circuit N2. An output of the logical OR circuit N2 is used as the switching signal TEN, so that, as illustrated in FIG. 6, the temperature data St can be outputted even when the power of the imaging unit IM1 is turned off.

Figure 9A:
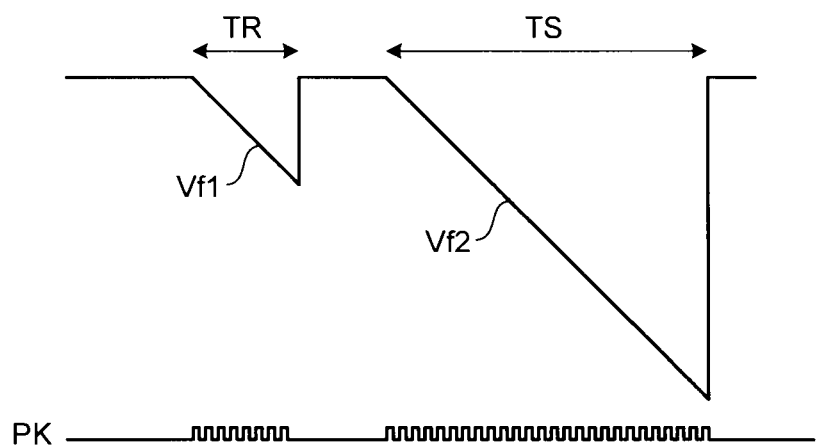
FIG. 9A is a diagram illustrating a relationship between ramp waves Vf1, Vf2 to be calibrated and a sensor clock PK.

FIG. 9A is a diagram illustrating a relationship between the ramp waves Vf1, Vf2 to be calibrated and the sensor clock PK.

In FIG. 9A, in the image column ADC 3-1, by using the ramp waves Vf1 and Vf2 as the reference voltage VF, the sensor clock PK is down-counted until the reference voltage VF corresponds to the pixel voltage Vs during the reset period TR, and the sensor clock PK is down-counted until the reference voltage VF corresponds to the pixel voltage Vs during the signal read period TS, so that the pixel voltage Vs is digitalized.

Here, if capacitance and resistance vary for each chip due to manufacturing variation in manufacturing processes, capacitance and current of the reference voltage generation unit 6 vary. Therefore, the slopes of the ramp wave Vf1 and Vf2 vary for each chip, and the analog gain varies.

At this time, a calibration code is inputted into the D/A conversion circuit 14 in FIG. 2 and converted into a calibration voltage Vk by the D/A conversion circuit 14, and then the calibration voltage Vk is inputted into the correction column ADC 3-2. Then, the calibration voltage Vk is digitalized in the correction column ADC 3-2, so that the calibration data Sk is outputted and a ratio between the value of the calibration code and the calibration data Sk can be set as a correction coefficient. An operation parameter of the reference voltage generation unit 6 is changed on the basis of the correction coefficient, so that it is possible to absorb chip variation to absorb variation of the slopes of the ramp waves Vf1 and Vf2 between chips, and compensate variation of the analog gain.

Figure 9B:
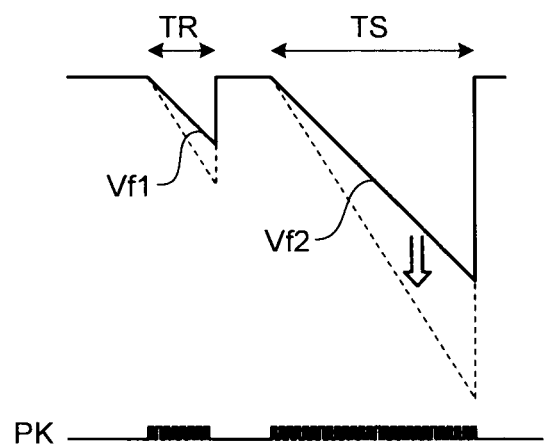
FIG. 9B is a diagram illustrating a relationship between slopes of the ramp waves Vf1, Vf2 to be calibrated and a frequency of the sensor clock PK.

FIG. 9B is a diagram illustrating a relationship between the slopes of the ramp waves Vf1, Vf2 to be calibrated and a frequency of the sensor clock PK.

In FIG. 9B, if the slopes of the ramp waves Vf1 and Vf2 are constant, when the frequency of the sensor clock PK changes, the analog gain changes.

At this time, a calibration code is inputted into the D/A conversion circuit 14 in FIG. 2 and converted into a calibration voltage Vk by the D/A conversion circuit 14, and then the calibration voltage Vk is inputted into the correction column ADC 3-2. Then, the calibration voltage Vk is digitalized in the correction column ADC 3-2, so that the calibration data Sk is outputted and a ratio between the value of the calibration code and the calibration data Sk can be set as a correction coefficient. An operation parameter of the reference voltage generation unit 6 is changed on the basis of the correction coefficient, so that it is possible to change the slopes of the ramp waves Vf1 and Vf2 and compensate variation of the analog gain.

The calibration operation of the reference voltage VF can be performed at the head (vertical blank period) of a first frame after the frequency of the sensor clock PK changes.

Figure 10:
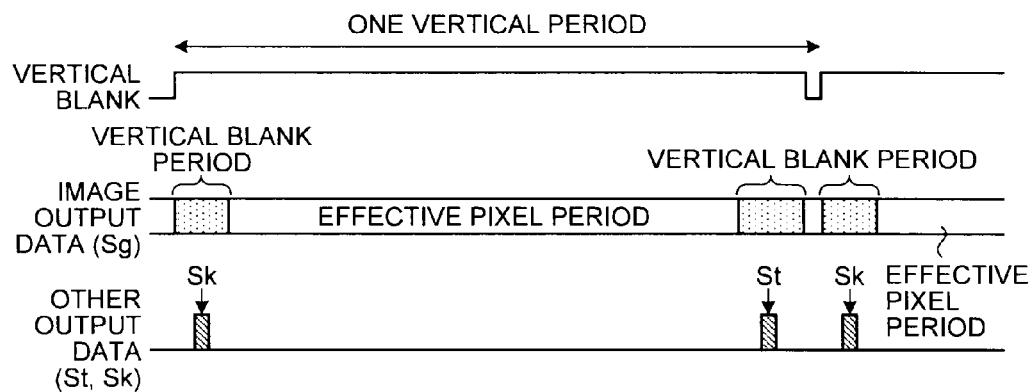
FIG. 10 is a timing chart illustrating an imaging operation and the temperature measurement operation of the solid state imaging device in FIG. 2.

FIG. 10 is a timing chart illustrating the imaging operation and the temperature measurement operation of the solid state imaging device in FIG. 2.

In FIG. 10, an effective pixel period is provided in one vertical period (one frame period), and a vertical blank period is provided before and after the effective pixel period. The calibration data Sk is outputted in a calibration period in the vertical blank period before one vertical period (one frame period) and the temperature data St is outputted in the vertical blank period after one vertical period (one frame period).

Thereby, the calibration operation of the reference voltage VF can be performed at the head of one frame and the temperature measurement can be performed for each frame without affecting the imaging operation.

The temperature measurement may be performed once in one horizontal period in one vertical period, or may be performed multiple times in multiple horizontal periods in one vertical blank period.

Figure 11:
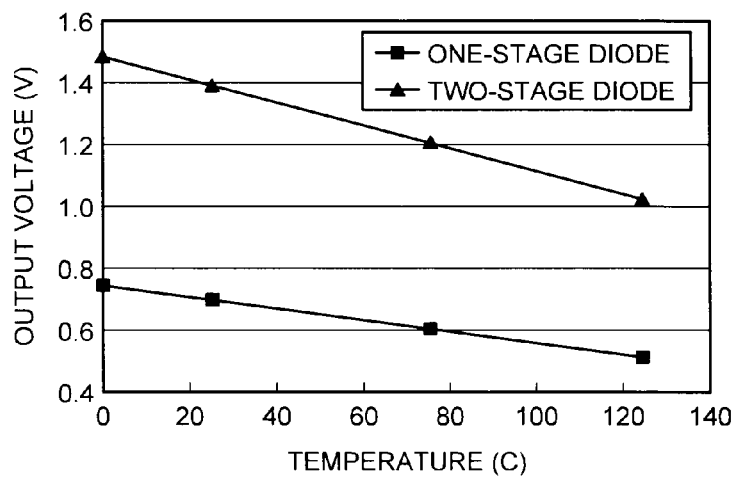
FIG. 11 is a diagram illustrating a relationship between a diode voltage Vt of the temperature sensor 8 in FIG. 2 and temperature.

FIG. 11 is a diagram illustrating a relationship between the diode voltage Vt of the temperature sensor 8 in FIG. 2 and temperature.

In FIG. 11, a voltage change rate per 1° C. is −2.0 mV/° C. when one stage of diode is used, and −4.0 mV/° C. when two stages of diodes are used. Therefore, if it is assumed that the resolution of the D/A conversion circuit 14 is 5 mv/LSB, the resolution is −2.5° C./LSB when one stage of diode is used, and −1.25° C./LSB when two stages of diodes are used. If digital code values in a temperature table are calculated in advance, temperature can be read from outputted digital data.

A temperature coefficient has a minus slope, so that, if the outputted digital data is eventually inverted, the output voltage can have a positive slope with respect to temperature. Thus, it is possible to easily measure temperature.

Figure 12:
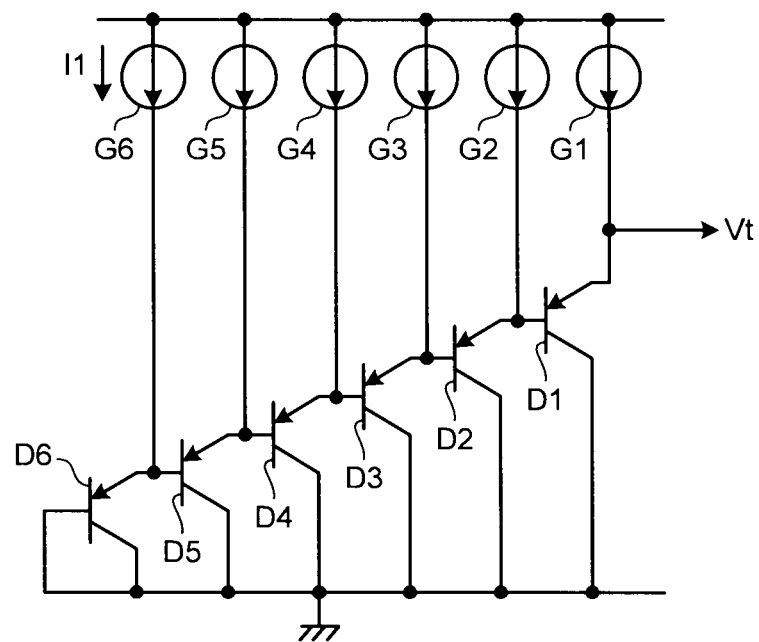
FIG. 12 is a circuit diagram illustrating another configuration example of the temperature sensor 8 in FIG. 2.

FIG. 12 is a circuit diagram illustrating another configuration example of the temperature sensor 8 in FIG. 2.

In FIG. 12, the temperature sensor 8 is provided with a plurality of diodes D1 to D6 and a plurality of current sources G1 to G6 for setting diode currents of these diodes D1 to D6 respectively. In the example of FIG. 11, a case is shown in which six diodes D1 to D6 and six current sources G1 to G6 are provided. Here, the currents outputted from the current sources G1 to G6 can be set to I1, and the diode currents of the diodes D1 to D6 can be equal to each other.

The diodes D1 to D6 are connected so that a diode voltage of one diode is received by the next-stage diode. For example, when the diodes D1 to D6 are formed by bipolar transistors, the current sources G1 to G6 can be connected to the emitters of the bipolar transistors respectively and the ground potential can be connected to the collectors of the bipolar transistors. The base of each bipolar transistor can be connected to the emitter of the next-stage bipolar transistor. However, the ground potential can be connected to the emitter of the last-stage bipolar transistor.

Here, by multi-stage connecting the diodes D1 to D6, as illustrated in FIG. 11, the output voltage can be increased.

(Second Embodiment)

Figure 13:
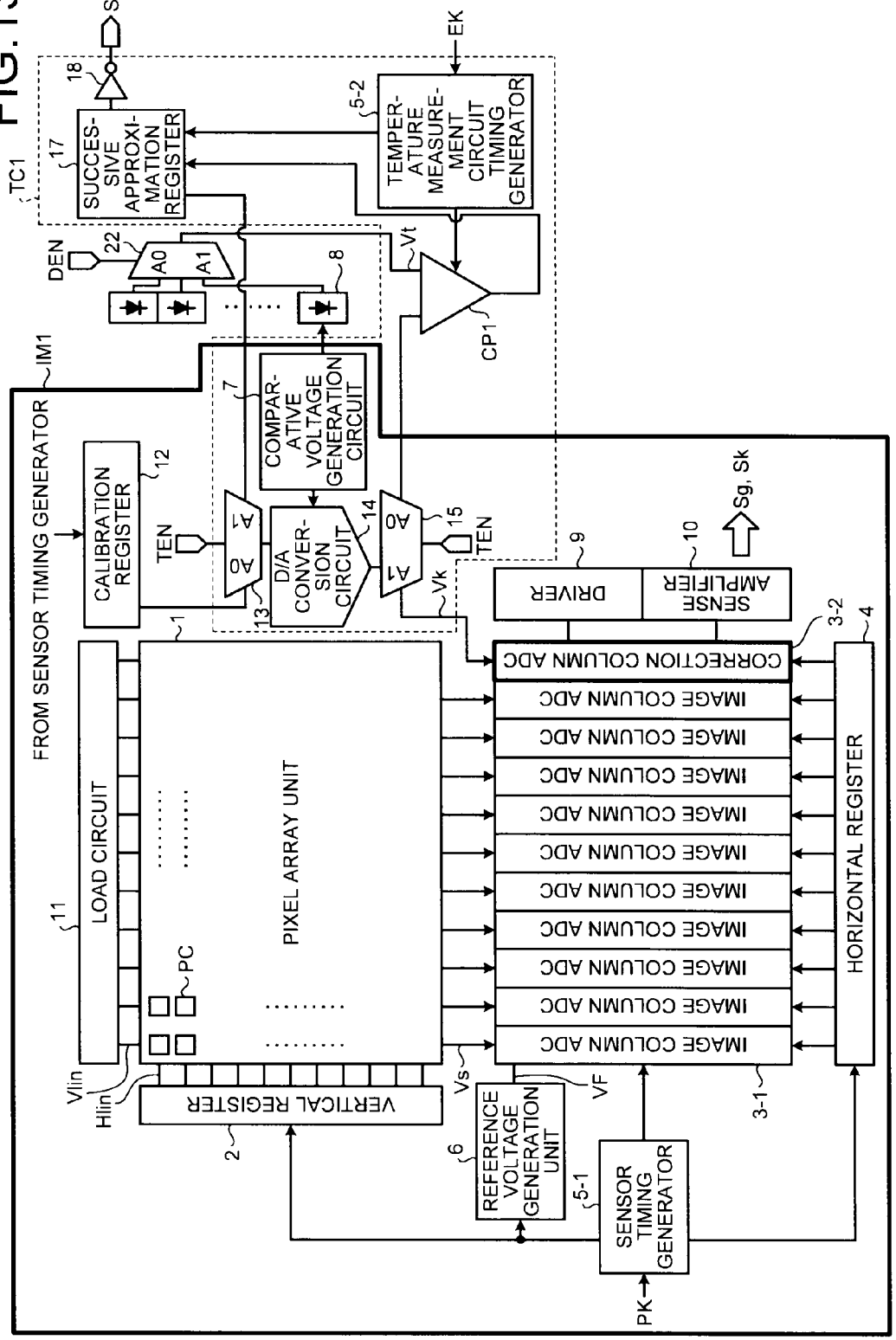
FIG. 13 is a block diagram illustrating a schematic configuration of a solid state imaging device according to a second embodiment.

FIG. 13 is a block diagram illustrating a schematic configuration of a solid state imaging device according to a second embodiment.

The solid state imaging device in FIG. 13 is formed by adding a plurality of temperature sensors and a selector 22 to the solid state imaging device in FIG. 2. Here, each temperature sensor 8 can be formed in the same manner. The selector 22 can switch diode voltages of the temperature sensors 8 on the basis of a switching signal DEN and output one of them to the comparator CP1. Although the number of wiring lines increases, one temperature diode may be disposed in each row pitch, and the temperature diode in use may be switched.

Here, a plurality of temperature sensors 8 are provided in the solid state imaging device, so that it is possible to improve accuracy of the temperature measurement even when the temperature varies in the solid state imaging device.

Figure 14:
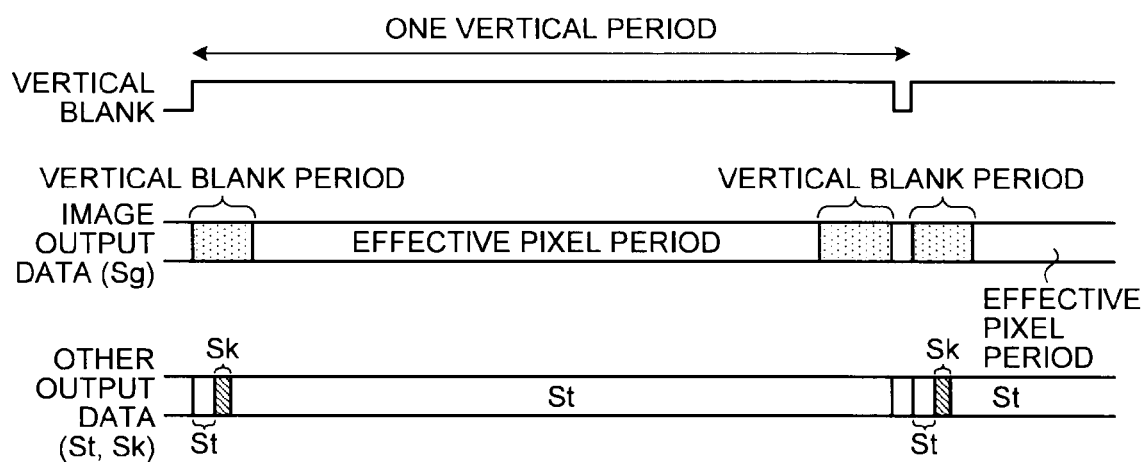
FIG. 14 is a timing chart illustrating an imaging operation and a temperature measurement operation of the solid state imaging device in FIG. 13.

FIG. 14 is a timing chart illustrating the imaging operation and the temperature measurement operation of the solid state imaging device in FIG. 13.

In FIG. 14, the temperature data St can be outputted for each H period by using the D/A conversion circuit to measure temperature in all H periods other than H periods used for a normal imaging operation (VREF calibration) and switching the temperature diode in use in each H period.

Thereby, the calibration operation of the reference voltage VF and the temperature measurement operation by the temperature sensors 8 can be performed for each frame without affecting the imaging operation.

(Third Embodiment)

Figure 15:
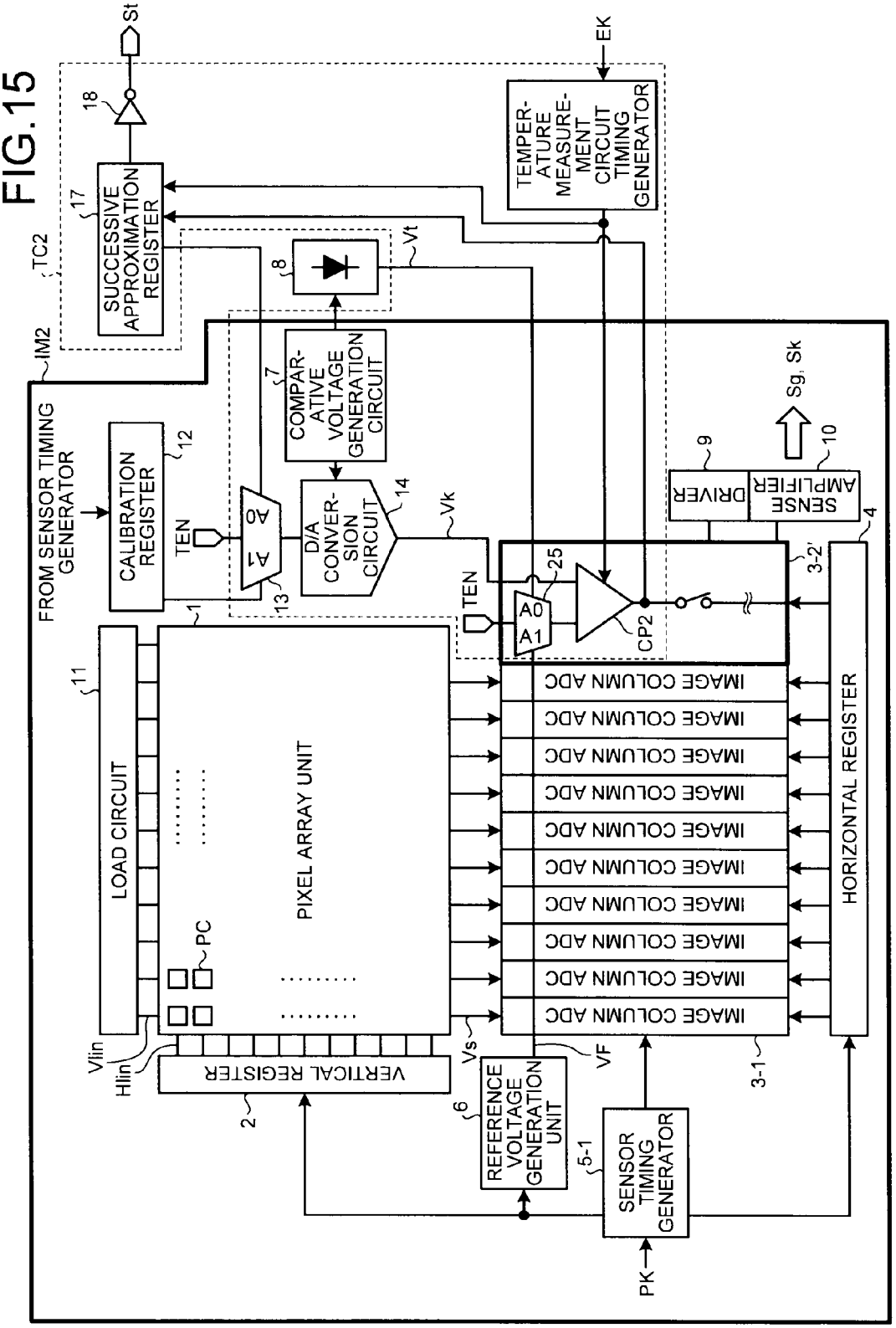
FIG. 15 is a block diagram illustrating a schematic configuration of a solid state imaging device according to a third embodiment.

FIG. 15 is a block diagram illustrating a schematic configuration of a solid state imaging device according to a third embodiment.

In FIG. 15, the solid state imaging device is provided with an imaging unit IM2 and an output circuit TC2 instead of the imaging unit IM1 and the output circuit TC1 of the solid state imaging device in FIG. 1. The imaging unit IM2 is provided with a correction column ADC 3-2' instead of the correction column ADC 3-2 in FIG. 1.

The correction column ADC 3-2' is formed by adding a selector 25 to the correction column ADC 3-2. The selector 25 switches between the reference voltage VF and the diode voltage Vt and outputs one of them to the comparator CP2.

The output circuit TC2 is formed by removing the comparator CP1 and the selector 15 from the output circuit TC1. The output of the D/A conversion circuit 14 is inputted into the comparator CP2, and the output of the comparator CP2 is connected to the successive approximation register 17.

When the calibration code is selected by the selector 13 and the reference voltage VF is selected by the selector 25, the calibration code is converted into analog by the D/A conversion circuit 14, so that the calibration code is converted into the calibration voltage Vk and outputted to the comparator CP2. Then, the calibration voltage Vk and the reference voltage VF are compared by the comparator CP2 according to the sensor clock PK. Then, in the correction column ADC 3-2', the calibration voltage Vk is digitalized on the basis of the comparison result of the comparator CP2, and outputted as the calibration data Sk via the sense amplifier 10.

On the other hand, when the value held by the successive approximation register 17 is selected by the selector 13 and the diode voltage Vt is selected by the selector 25, the value held by the successive approximation register 17 is converted into analog by the D/A conversion circuit 14 and inputted into the comparator CP2. Then, in the comparator CP2, outputs of the D/A conversion circuit 14 are sequentially compared with the diode voltage Vt according to the system clock EK and the comparison results are sequentially stored in the successive approximation register 17, so that the diode voltage Vt is digitalized and outputted as the temperature data St via the inverter 18.

Here, the comparative voltage generation unit 7, the D/A conversion circuit 14, the comparator CP2, and the selectors 13 and 25 are shared between the imaging unit IM2 and the output circuit TC2, so that it is possible to mount the temperature sensor 8 in the solid state imaging device while reducing a circuit scale of the output circuit TC2.

Figure 16:
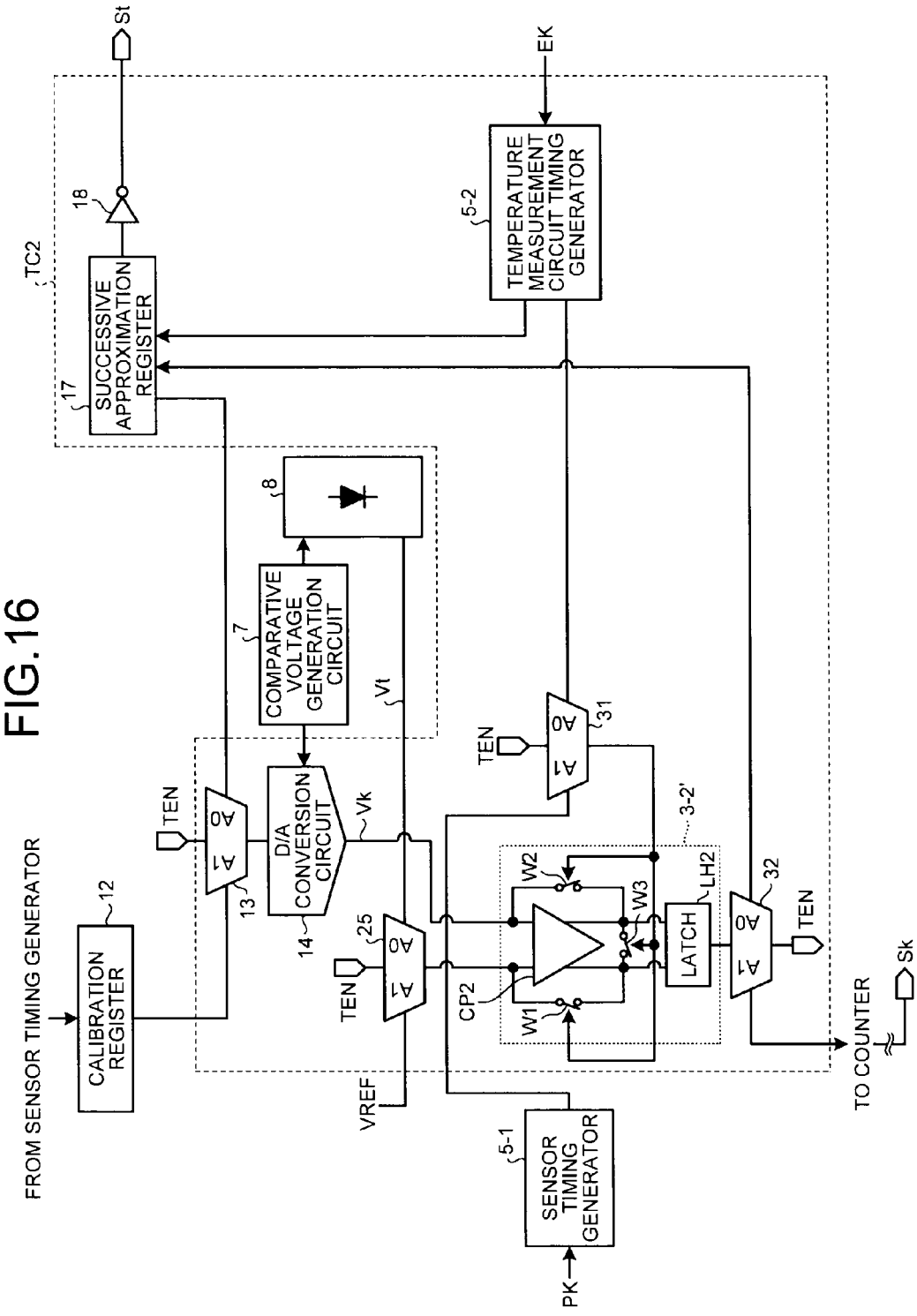
FIG. 16 is a block diagram illustrating a detailed configuration example of an output circuit TC2 in FIG. 15.

FIG. 16 is a block diagram illustrating a detailed configuration example of the output circuit TC2 in FIG. 15.

In FIG. 16, the switching signal TEN is inputted into the selectors 13, 25, 31, and 32. When the calibration code is selected by the selector 13 and the reference voltage VF is selected by the selector 25, the sensor timing generator 5-1 is selected by the selector 31 and a counter of the correction column ADC 3-2' is selected by the selector 32.

Then, the calibration code is converted into analog by the D/A conversion circuit 14, so that the calibration code is converted into the calibration voltage Vk and outputted to the comparator CP2. The switches W1 to W3 are turned on for each horizontal period, so that an operating point of the comparator CP2 is set. When the switches W1 to W3 are turned off, the calibration voltage Vk and the reference voltage VF are compared by the comparator CP2 and the comparison result is outputted to the counter of the correction column ADC 3-2' via the latch circuit LH2.

On the other hand, when the value held by the successive approximation register 17 is selected by the selector 13 and the diode voltage Vt is selected by the selector 25, the temperature measurement circuit timing generator 5-2 is selected by the selector 31 and the successive approximation register 17 is selected by the selector 32.

Then, the value held by the successive approximation register 17 is converted into analog by the D/A conversion circuit 14 and inputted into the comparator CP2. The switches W1 to W3 are turned on for each temperature measurement, so that an operating point of the comparator CP2 is set. When the switches W1 to W3 are turned off, the output of the D/A conversion circuit 14 and the diode voltage Vt are compared by the comparator CP2 and the comparison result is outputted to the successive approximation register 17 via the latch circuit LH2.

(Fourth Embodiment)

Generally, as illustrated in FIG. 6, the time at which the standby state is established is not predetermined, and the standby state starts from a time at which a user sets a camera in a sleep state. Therefore, the standby state may be established in the middle of the operation in one frame.

Figure 17:
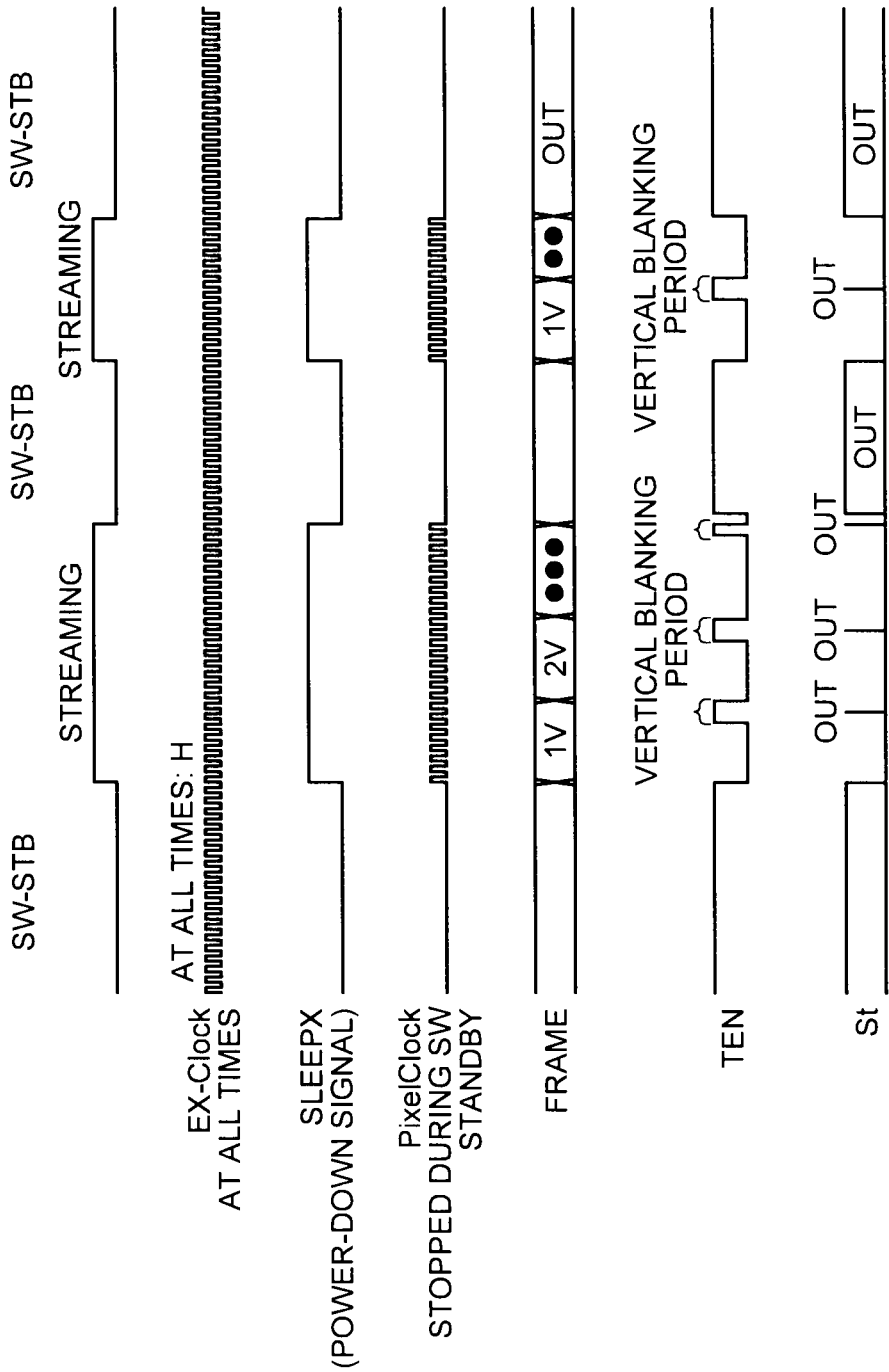
FIG. 17 is a timing chart illustrating a temperature measurement operation for explaining a fourth embodiment.

Thus, for example, even if one H period in Vblank is secured for an enable signal, as illustrated in FIG. 17, the standby state may be established in the middle of one H period of temperature measurement in Vblank. In this case, an enable period is shorter than a minimum number of conversion clk cycles and accurate temperature measurement cannot be performed.

Therefore, a case will be described in which, before the enable signal is inputted into a temperature sensor circuit unit, a latch circuit is inserted and an EN pulse is generated so that the enable signal is held at least during a minimum conversion clk cycle period as illustrated in FIG. 17, in other words, the temperature measurement can be performed at least once even when a very short enable signal is inputted.

Figure 18:
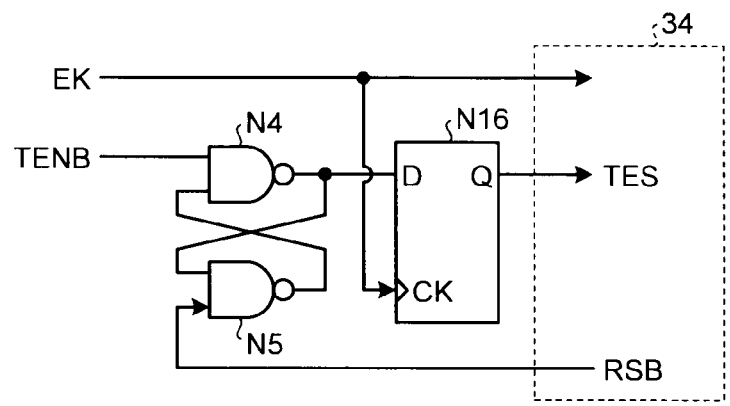
FIG. 18 is a diagram illustrating a circuit for generating an internal enable signal TES applied to a solid state imaging device according to the fourth embodiment.

FIG. 18 is a diagram illustrating a circuit for generating an internal enable signal TES applied to a solid state imaging device according to a fourth embodiment.

In FIG. 18, the output of a NAND circuit N4 and the output of a NAND circuit N5 are respectively connected to one input of the NAND circuit N5 and one input of the NAND circuit N4. A switching inversion signal TENS is inputted into the other input of the NAND circuit N4 and a reset signal RSB is inputted into the other input of the NAND circuit N5. The switching inversion signal TENB is a signal obtained by inverting the switching signal TEN. The output of the NAND circuit N4 is connected to the input of a flip-flop N6. The system clock EK is inputted into the clock terminal of the flip-flop N6. An internal enable signal TES is inputted into a temperature measurement circuit unit 34.

When the internal enable signal TES is high level, the temperature measurement circuit unit 34 can perform the temperature measurement operation.

Figure 19:
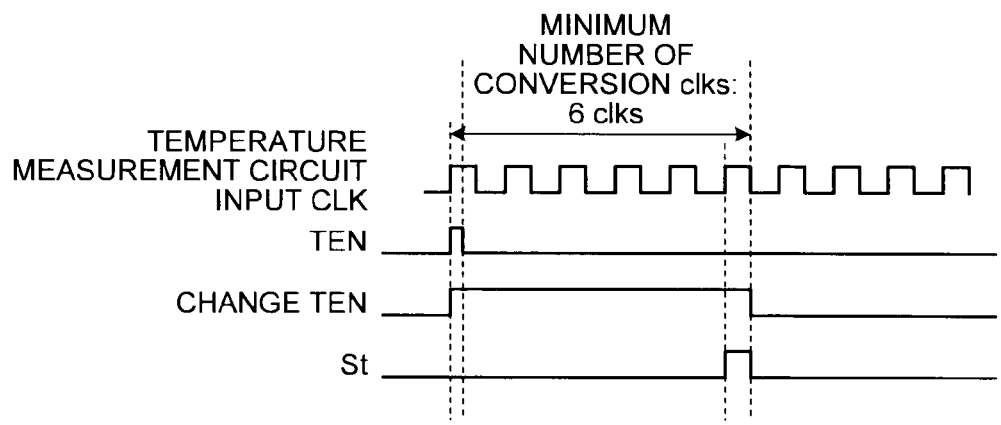
FIG. 19 is a timing chart illustrating a temperature measurement operation when the internal enable signal TES in FIG. 18 is used.

FIG. 19 is a timing chart illustrating the temperature measurement operation when the internal enable signal TES in FIG. 18 is used.

In FIG. 19, when the switching signal TEN rises, the internal enable signal TES rises. In the temperature measurement circuit unit 34, when the internal enable signal TES rises, the temperature measurement operation is performed, and when the temperature data St is outputted, a reset signal RST is issued and the internal enable signal TES falls.

Thereby, when the standby state is established in the middle of the operation in one frame, even if a high level period of the switching signal TEN is shorter than an input period of the minimum number of conversion clocks necessary to perform one temperature measurement operation, it is possible to secure a period necessary to perform one temperature measurement operation and secure accuracy of the temperature measurement.

(Fifth Embodiment)

Figure 20:
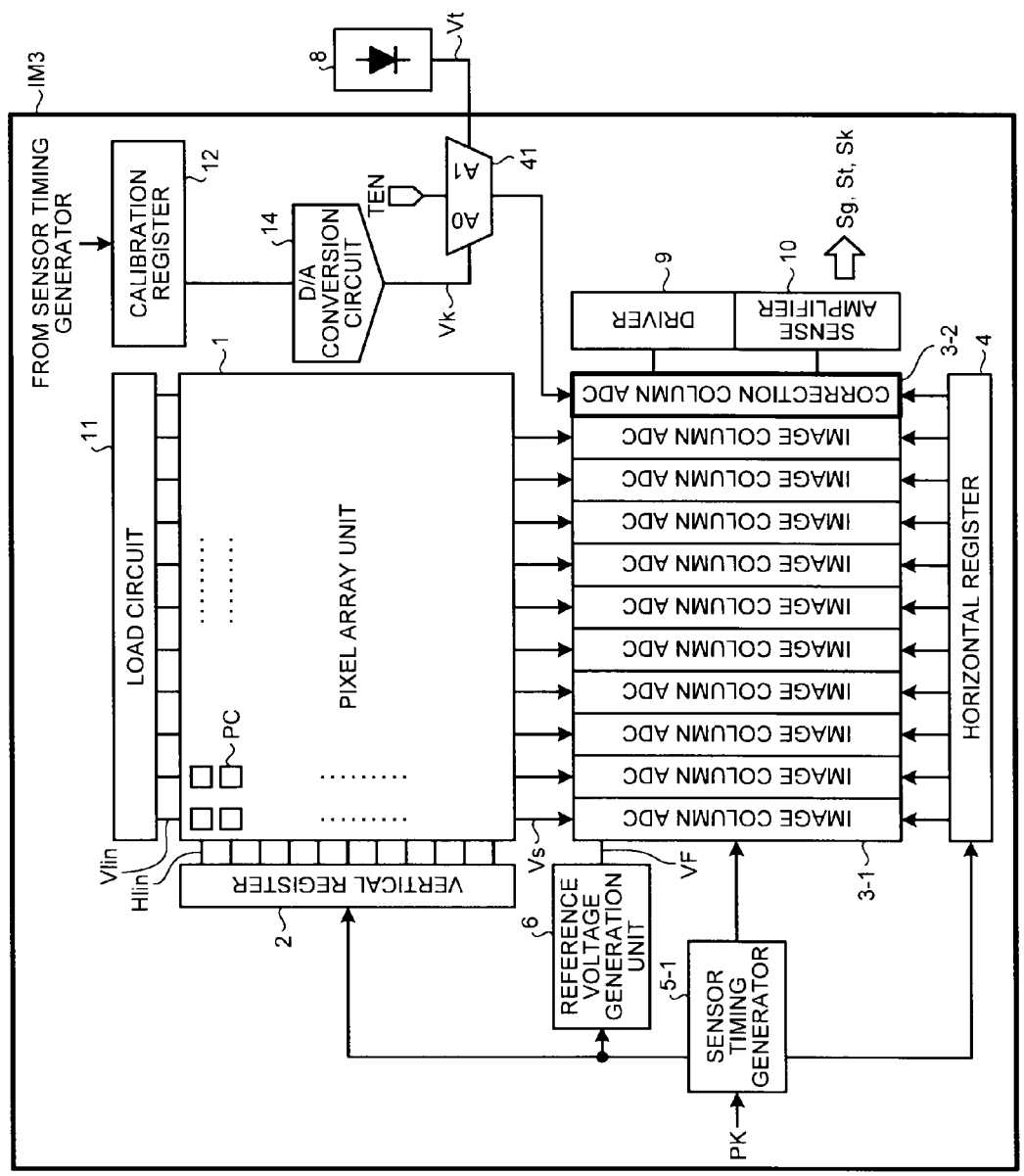
FIG. 20 is a block diagram illustrating a schematic configuration of a solid state imaging device according to a fifth embodiment.

FIG. 20 is a block diagram illustrating a schematic configuration of a solid state imaging device according to a fifth embodiment.

In FIG. 20, the solid state imaging device is provided with an imaging unit IM3 and a temperature sensor 8. The imaging unit IM3 is provided with a pixel array unit 1, a vertical register 2, an image column ADCs 3-1, a correction column ADC 3-2, a horizontal register 4, a sensor timing generator 5-1, a reference voltage generation unit 6, a driver 9, a sense amplifier 10, a load circuit 11, a calibration register 12, a D/A conversion circuit 14, and a selector 41.

The switching signal TEN is inputted into the selector 41. The selector 41 switches between the calibration voltage Vk and the diode voltage Vt and outputs one of them to the correction column ADC 3-2.

When the calibration voltage Vk is selected by the selector 41, the calibration voltage Vk is outputted to the correction column ADC 3-2. Then, in the correction column ADC 3-2, the calibration voltage Vk is digitalized on the basis of a comparison result between the calibration voltage Vk and the reference voltage VF, and outputted as the calibration data Sk via the sense amplifier 10.

On the other hand, when the diode voltage Vt is selected by the selector 41, the diode voltage Vt is outputted to the correction column ADC 3-2. Then, in the correction column ADC 3-2, the diode voltage Vt is digitalized on the basis of a comparison result between the diode voltage Vt and the reference voltage VF, and outputted as the temperature data St via the sense amplifier 10. The temperature data St can be outputted at least once in one frame period. An output terminal of the temperature data St can be shared with output terminals of the calibration data Sk and the pixel data Sg.

Here, the diode voltage Vt is converted into the temperature data St in the correction column ADC 3-2, so that an individual output circuit need not be provided to measure temperature, and it is possible to mount the temperature sensor 8 in the solid state imaging device while reducing the scale of the circuit.

Figure 21:
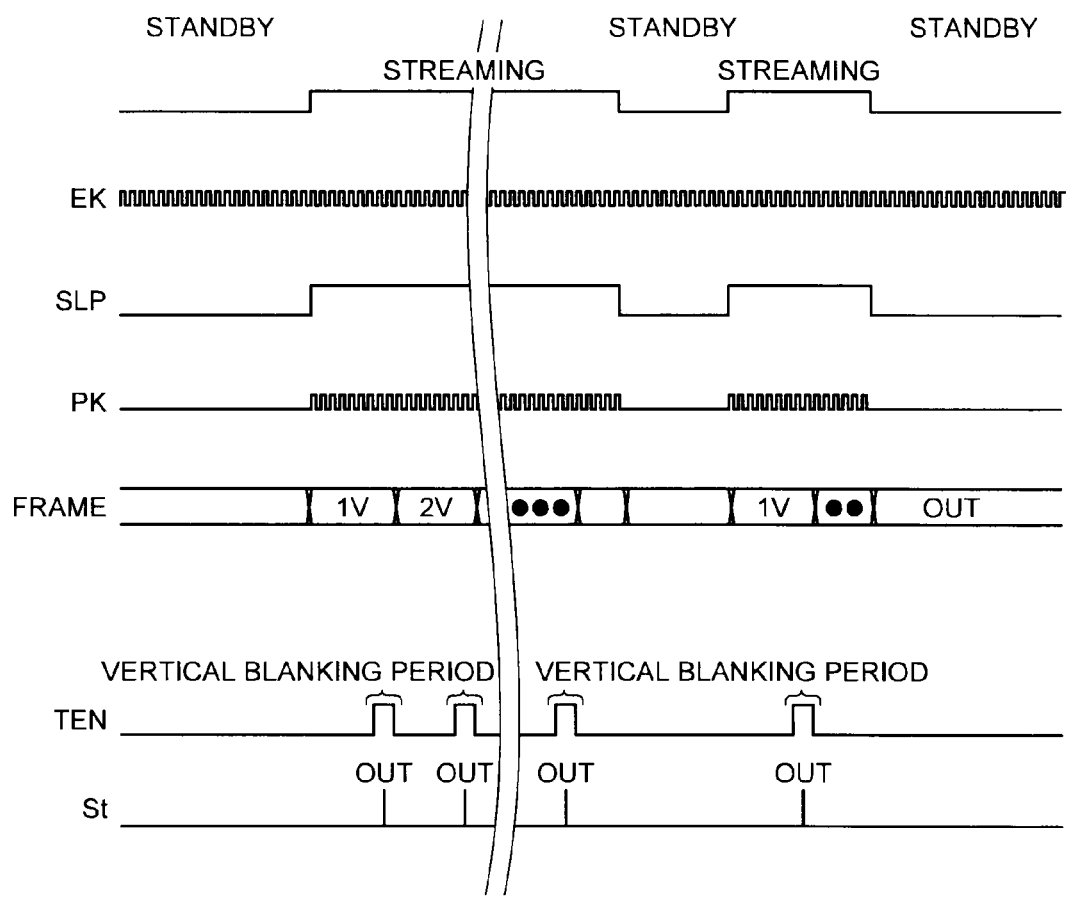
FIG. 21 is a timing chart illustrating a temperature measurement operation of the solid state imaging device in FIG. 20.

FIG. 21 is a timing chart illustrating the temperature measurement operation of the solid state imaging device in FIG. 20.

In FIG. 21, when the power-down signal SLP is high level, the sensor clock PK is activated and the imaging operation is performed. In this case, in the vertical blanking period BH, the switching signal TEN is high level and the diode voltage Vt is selected by the selector 41. Thereby, the diode voltage Vt is outputted to the correction column ADC 3-2, and the temperature data St is outputted for each horizontal period.

On the other hand, when the power-down signal SLP is low level, the sensor clock PK is stopped. Thereby, the imaging operation and the temperature measurement operation are stopped, and outputs of the pixel data Sg and the temperature data St are stopped.

Figure 22:
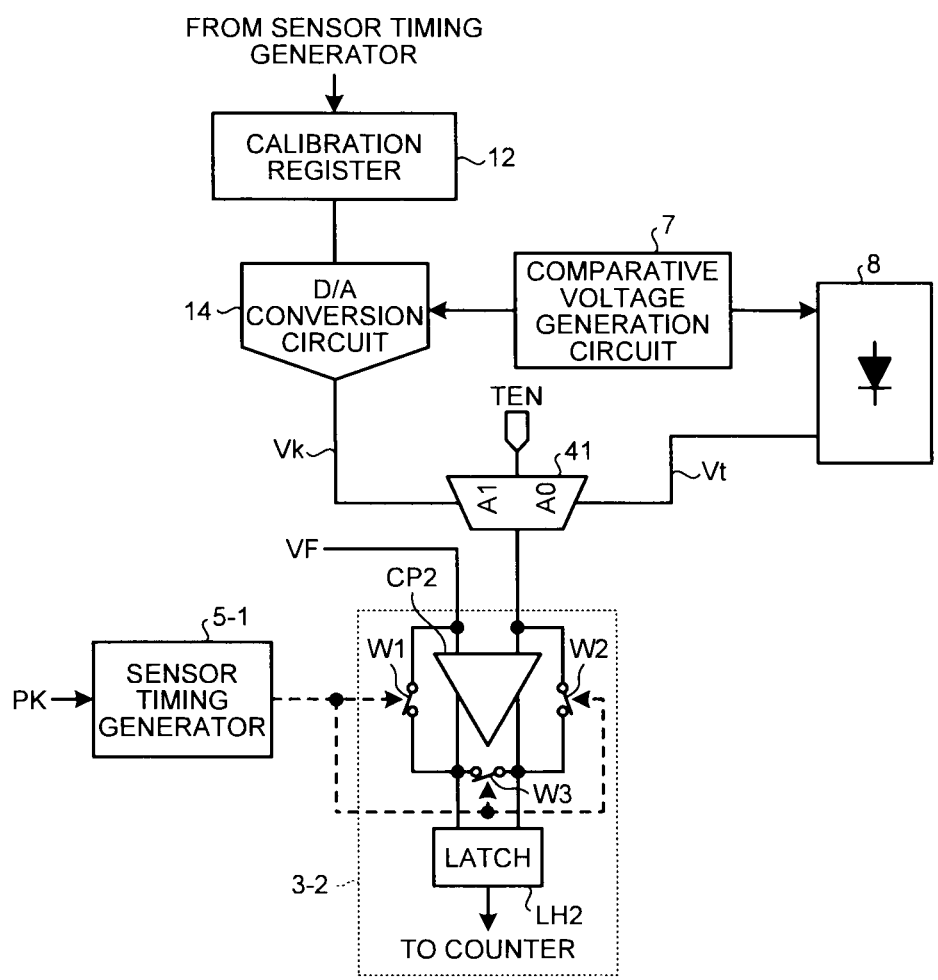
FIG. 22 is a block diagram illustrating a detailed configuration example of a temperature measurement unit of the solid state imaging device in FIG. 20.

FIG. 22 is a block diagram illustrating a detailed configuration example of a temperature measurement unit of the solid state imaging device in FIG. 20.

In FIG. 22, when the calibration voltage Vk is selected by the selector 41, the calibration voltage Vk is outputted to the comparator CP2. The switches W1 to W3 are turned on for each horizontal period, so that an operating point of the comparator CP2 is set. When the switches W1 to W3 are turned off, the calibration voltage Vk and the reference voltage VF are compared by the comparator CP2 and the comparison result is outputted to the counter of the correction column ADC 3-2 via the latch circuit LH2.

On the other hand, when the diode voltage Vt is selected by the selector 41, the diode voltage Vt is outputted to the comparator CP2. The switches W1 to W3 are turned on for each temperature measurement, so that an operating point of the comparator CP2 is set. When the switches W1 to W3 are turned off, the diode voltage Vt and the reference voltage VF are compared by the comparator CP2 and the comparison result is outputted to the counter of the correction column ADC 3-2 via the latch circuit LH2.

Figure 23:
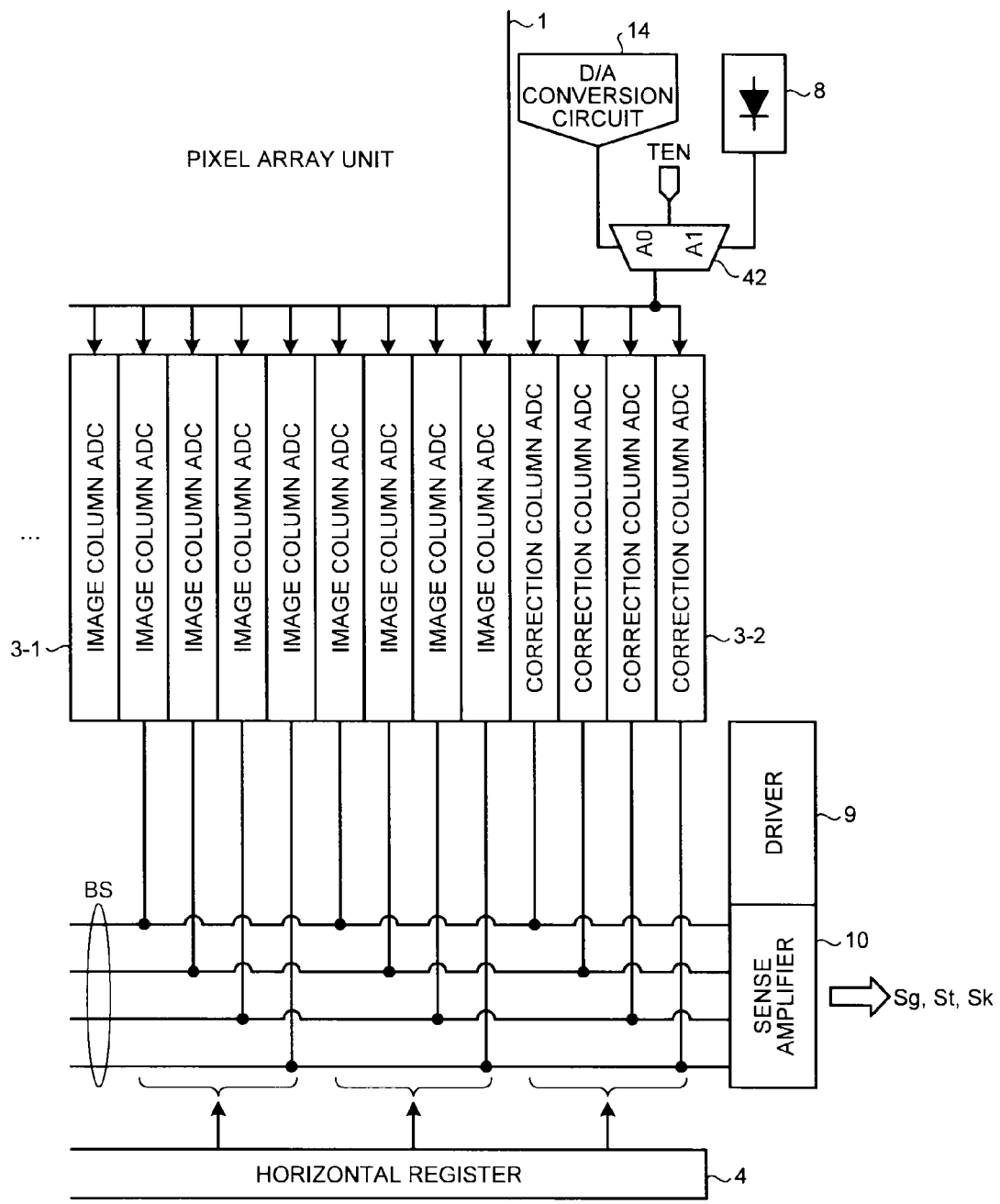
FIG. 23 is a block diagram illustrating a method for transferring a pixel signal Sg and a temperature signal St of the solid state imaging device in FIG. 20.

FIG. 23 is a block diagram illustrating an example of a method for transferring the pixel signal Sg and the temperature signal St in FIG. 20.

In FIG. 23, a plurality of horizontal transfer buses BS for transferring the pixel data Sg and the temperature data St are provided in this solid state imaging device compared with the solid state imaging device in FIG. 20. In the example of FIG. 23, a case is shown in which four horizontal transfer buses BS are provided. Four pixel data Sg and four temperature data St can be transferred in parallel through the horizontal transfer buses BS. When the number of the horizontal transfer buses BS is four, it is preferred that the number of the image column ADCs 3-1 and the number of the correction column ADCs 3-2 are set to be a multiple of four.

Here, a plurality of horizontal transfer buses BS are provided, so that it is possible to reduce the transfer time of the pixel data Sg and the temperature data St and speed up correction processing of the pixel data Sg using the temperature data St.

Figure 24:
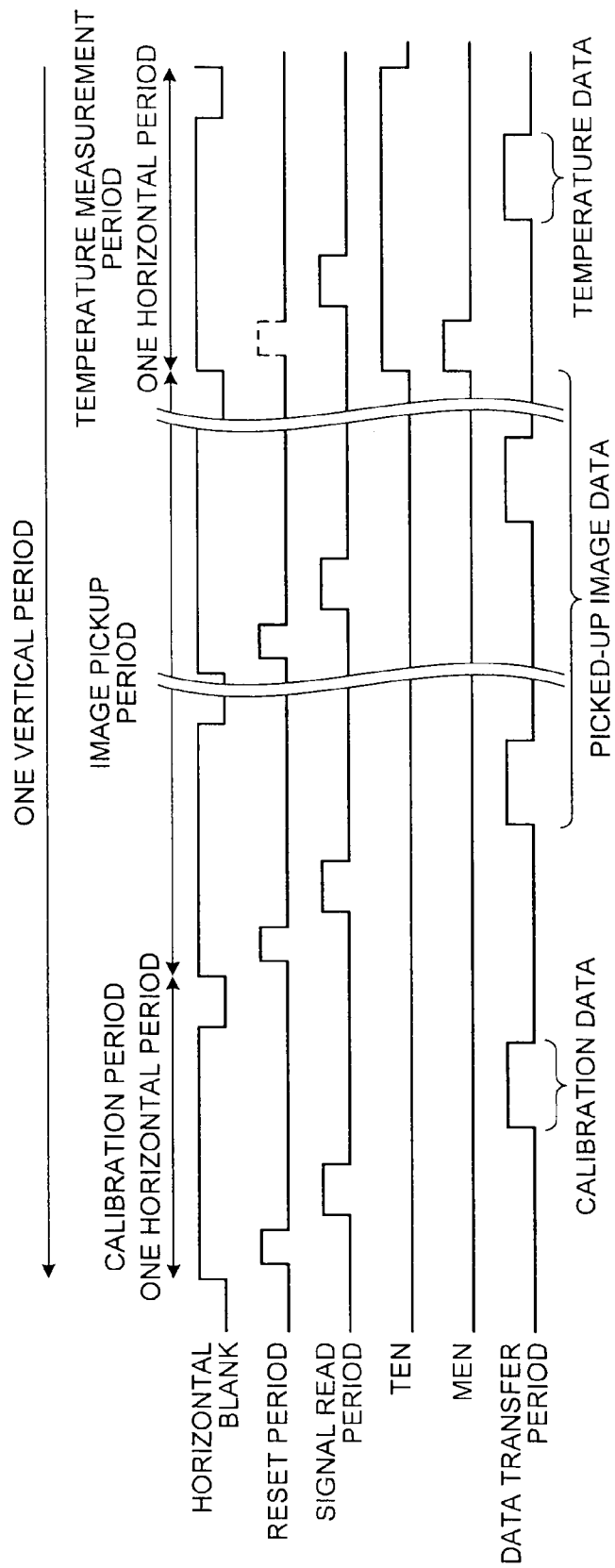
FIG. 24 is a timing chart illustrating a temperature measurement operation and a calibration operation of the solid state imaging device in FIG. 20.

FIG. 24 is a timing chart illustrating the temperature measurement operation and the calibration operation of the solid state imaging device in FIG. 20.

In FIG. 24, a calibration period, an imaging period, and a temperature measurement period are set in one vertical period (one frame period). In the reset period in the temperature measurement period, a mask signal MEN becomes high level, and in the reset period in the temperature measurement period, an AD conversion operation in the correction column ADC 3-2 is stopped so that the ramp wave Vf1 is not generated.

Thereby, even when the calibration operation and the temperature measurement operation share the correction column ADC 3-2, it is possible to implement A/D conversion without CDS processing of the temperature measurement operation being performed while enabling CDS operation in the calibration operation.

Figure 25:
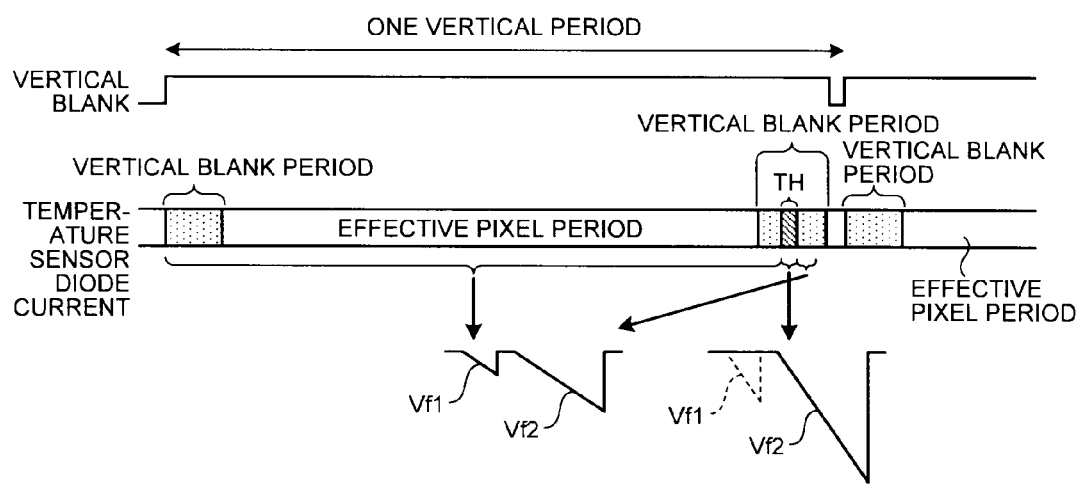
FIG. 25 is a timing chart illustrating a method for changing an analog gain when reading a pixel voltage Vs of a pixel PC of the solid state imaging device and when reading a diode voltage Vt of a temperature sensor 8 in FIG. 20.

FIG. 25 is a timing chart illustrating a method for changing an analog gain when reading the pixel voltage Vs of the pixel PC of the solid state imaging device and when reading the diode voltage Vt of the temperature sensor 8 in FIG. 20.

In FIG. 25, a temperature measurement period TH is set in a vertical blank period in one vertical period (one frame period).

Here, when one stage of the diode D in FIG. 4 is used, as illustrated in FIG. 11, the maximum output is about 0.8 V. Therefore, in the temperature measurement period TH, an amplitude of the ramp wave Vf2 can be set to about 0.8 V. Further, in the reset period in the temperature measurement period TH, the ramp wave Vf1 is masked, so that it is possible to implement A/D conversion without CDS processing of the temperature measurement operation being performed.

On the other hand, the slopes of the ramp waves Vf1 and Vf2 are variable during the imaging operation, so that the analog gain can be set according to an amount of incident light into the photodiode PD.

(Sixth Embodiment)

Figure 26:
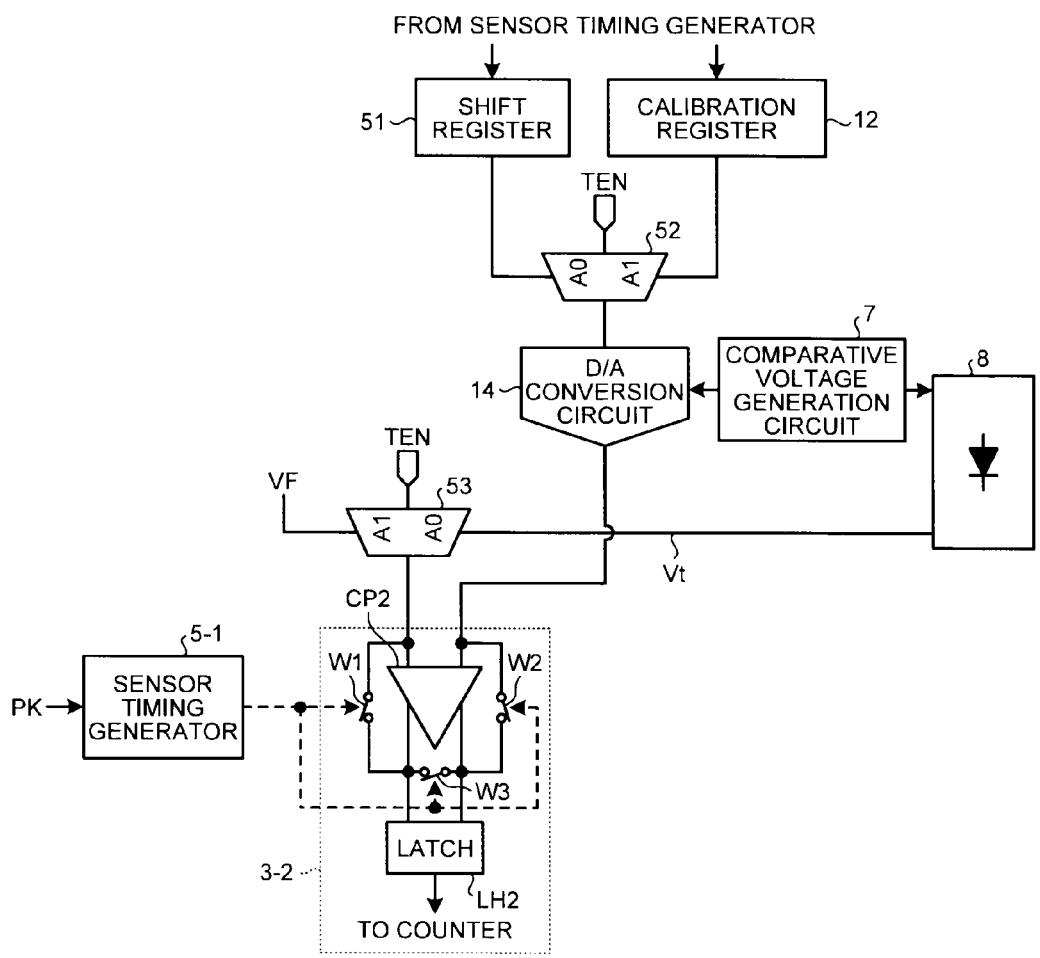
FIG. 26 is a block diagram illustrating a detailed configuration of a temperature measurement unit of a solid state imaging device according to a sixth embodiment.

FIG. 26 is a block diagram illustrating a detailed configuration of a temperature measurement unit a solid state imaging device according to a sixth embodiment.

In FIG. 26, a reference voltage code corresponding to the reference voltage VF can be stored in the shift register 51. The selector 52 can switch between the reference voltage code stored in the shift register 51 and a calibration code stored in the calibration register 12 and output one of them to the D/A conversion circuit 14. The selector 53 can switch between the reference voltage VF and the diode voltage Vt and output one of them to the comparator CP2. The switching signal TEN is inputted into the selectors 52 and 53.

When the calibration code is selected by the selector 52, the reference voltage VF is selected by the selector 53. Then, the calibration code is converted into analog by the D/A conversion circuit 14, so that the calibration code is converted into the calibration voltage Vk and outputted to the comparator CP2. The switches W1 to W3 are turned on for each horizontal period, so that an operating point of the comparator CP2 is set. When the switches W1 to W3 are turned off, the calibration voltage Vk and the reference voltage VF are compared by the comparator CP2 and the comparison result is outputted to the counter of the correction column ADC 3-2 via the latch circuit LH2.

On the other hand, when the reference voltage code is selected by the selector 52, the diode voltage Vt is selected by the selector 53. The reference voltage code is converted into analog by the D/A conversion circuit 14, so that the reference voltage VF is generated and outputted to the comparator CP2. The switches W1 to W3 are turned on for each temperature measurement, so that an operating point of the comparator CP2 is set. When the switches W1 to W3 are turned off, the reference voltage VF and the diode voltage Vt are compared by the comparator CP2 and the comparison result is outputted to the successive approximation register 17 via the latch circuit LH2.

Here, the D/A conversion circuit 14 converts the reference voltage code into analog and generates the reference voltage VF used in the temperature measurement operation, so that it is not necessary to change the reference voltage VF outputted from the reference voltage generation unit 6 when the imaging operation is switched to the temperature measurement operation, and the analog gain in one frame period can be maintained constant.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid state imaging device comprising:
an imaging unit configured to output imaging data by performing an imaging operation;
a temperature sensor configured to output a diode voltage according to a diode current; and
an output circuit configured to share a part of a circuit with the imaging unit and output temperature data based on the diode voltage outputted from the temperature sensor,
wherein an effective pixel period is provided in one vertical period, a first vertical blank period is provided before the effective pixel period, a second vertical blank period is provided after the effective pixel period, calibration data is outputted in a calibration period in the first vertical blank period, and temperature data is outputted in the second vertical blank period.

2. The solid state imaging device according to claim 1, wherein the output circuit comprises a temperature measurement output circuit dedicated to temperature data.

3. The solid state imaging device according to claim 1, wherein
the imaging unit includes a sensor timing generator configured to control output timing of the imaging data on the basis of a sensor clock, and
the output circuit includes a temperature measurement circuit timing generator configured to control output timing of the temperature data on the basis of a system clock.

4. The solid state imaging device according to claim 3, wherein
the imaging unit includes a D/A conversion circuit configured to convert a calibration code into analog, and
the output circuit shares a D/A conversion circuit with the imaging unit when digitalizing the temperature data by successive approximation A/D conversion processing.

5. The solid state imaging device according to claim 4, wherein
the output circuit includes:
a comparator configured to compare a diode voltage outputted from the temperature sensor and an output from the D/A conversion circuit;
a successive approximation register configured to hold an output from the comparator;
a first selector configured to switch between the calibration code and a value held by the successive approximation register and output one of them to the D/A conversion circuit; and
a second selector configured to output the output from the D/A conversion circuit to the comparator or the imaging unit by switching between the comparator and the imaging unit, and
the imaging unit is selected by the second selector when the calibration code is selected by the first selector and the comparator is selected by the second selector when the value held by the successive approximation register is selected by the first selector.

6. The solid state imaging device according to claim 3, wherein
the imaging unit includes
a D/A conversion circuit configured to convert a calibration code into analog, and
a correction column ADC configured to digitalize a calibration voltage on the basis of a comparison result between a reference voltage and the calibration voltage, and
the output circuit shares the D/A conversion circuit and a comparator configured to compare the reference voltage and the calibration voltage with the imaging unit when digitalizing the temperature data by successive approximation A/D conversion processing.

7. The solid state imaging device according to claim 3, wherein
the imaging unit includes a D/A conversion circuit configured to convert a calibration code into analog, and
the output circuit shares a D/A conversion circuit and a comparator with the imaging unit when digitalizing the temperature data by successive approximation A/D conversion processing.

8. The solid state imaging device according to claim 6, wherein
the output circuit includes:
a successive approximation register configured to hold an output from the comparator;
a first selector configured to switch between the calibration code and a value held by the successive approximation register and output one of them to the D/A conversion circuit; and
a second selector configured to switch between the reference voltage and the diode voltage and output one of them to the comparator, and
the reference voltage is selected by the second selector when the calibration code is selected by the first selector and the diode voltage is selected by the second selector when the value held by the successive approximation register is selected by the first selector.

9. The solid state imaging device according to claim 3, wherein the imaging unit includes a correction column ADC configured to digitalize a calibration voltage on the basis of a comparison result between a reference voltage and the calibration voltage, and the output circuit shares the correction column ADC with the imaging unit when digitalizing the temperature data by integral A/D conversion processing.

10. The solid state imaging device according to claim 9, wherein the imaging unit includes
a selector configured to switch between the calibration voltage and the diode voltage and output one of them to the correction column ADC.

11. The solid state imaging device according to claim 9, wherein
the imaging unit includes:
a D/A conversion circuit configured to convert a calibration code into analog;
a first selector configured to switch between the calibration code and a reference voltage code and output one of them to the D/A conversion circuit; and
a second selector configured to switch between the reference voltage and an output of the D/A conversion circuit and output one of them to the correction column ADC, and
the reference voltage is selected by the second selector when the calibration code is selected by the first selector and the output of the D/A conversion circuit is selected by the second selector when the reference voltage code is selected by the first selector.

12. The solid state imaging device according to claim 1, wherein the temperature data is outputted at least once in one frame period.

13. The solid state imaging device according to claim 1, wherein
the temperature sensor includes:
a diode; and
a current source connected to the diode in series.

14. The solid state imaging device according to claim 1, wherein the temperature sensor is provided with a plurality of diodes which are connected so that a diode voltage of one diode is received by a next-stage diode.

15. The solid state imaging device according to claim 1, wherein the imaging operation is performed in a streaming state and temperature data is outputted during a vertical blanking period, and
in a standby state, temperature data is outputted in a state in which the imaging operation is stopped.

16. The solid state imaging device according to claim 1, wherein
the imaging operation is performed in a streaming state and temperature data is outputted during a vertical blanking period, and
the imaging operation and output of the temperature data are stopped in a standby state.

17. The solid state imaging device according to claim 1, wherein
the imaging unit includes:
a pixel array unit in which pixels that accumulate photo electrically-converted charge are arranged in a matrix form; and
an image column ADC configured to output a pixel data digitalized on the basis of a difference between a pixel voltage read from the pixel during a reset period and a pixel voltage read from the pixel during a signal read period.

18. The solid state imaging device according to claim 17, wherein
the pixel includes:
a photodiode configured to perform photoelectric conversion;
a read transistor configured to transfer a signal from the photodiode to a floating diffusion on the basis of a read signal;
a reset transistor configured to reset a signal accumulated in the floating diffusion on the basis of a reset signal; and
an amplifier transistor configured to detect a potential of the floating diffusion.

19. The solid state imaging device according to claim 18, wherein the imaging unit includes:
a vertical register configured to scan the pixel in a vertical direction; and
a horizontal register configured to scan the pixel in a horizontal direction.

* * * * *